United States Patent
He et al.

(10) Patent No.: US 11,627,437 B2
(45) Date of Patent: Apr. 11, 2023

(54) DEVICE SEARCHING METHOD AND ELECTRONIC DEVICE

(71) Applicant: Huawei Technologies Co., Ltd., Shenzhen (CN)

(72) Inventors: Yanshan He, Shenzhen (CN); Qiang Xu, Toronto (CA); Xuan Zhou, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/846,705

(22) Filed: Jun. 22, 2022

(65) Prior Publication Data

US 2022/0329976 A1 Oct. 13, 2022

Related U.S. Application Data

(63) Continuation of application No. PCT/CN2021/081517, filed on Mar. 18, 2021.

(30) Foreign Application Priority Data

Aug. 5, 2020 (CN) .......................... 202010779683.0

(51) Int. Cl.
*H04W 4/029* (2018.01)
*H04W 4/70* (2018.01)
*H04W 76/14* (2018.01)

(52) U.S. Cl.
CPC ............. *H04W 4/029* (2018.02); *H04W 4/70* (2018.02); *H04W 76/14* (2018.02)

(58) Field of Classification Search
CPC ........ H04W 4/029; H04W 4/70; H04W 76/14
See application file for complete search history.

(56) References Cited

U.S. PATENT DOCUMENTS 9,532,312 B1 * 12/2016 Kim .................. H04W 52/0277
2013/0278631 A1   10/2013 Border et al.
2015/0072704 A1 *  3/2015 Colby ................... H04W 4/023
                                                                455/456.1

(Continued)

FOREIGN PATENT DOCUMENTS

CN        103840857 A      6/2014
CN        104333845 A      2/2015

(Continued)

OTHER PUBLICATIONS

Zou Hao et al, "Research on Color Guidance Robot System Based on OPENMV," Science and Technology, 2018, with the English Translation, 6 pages.

*Primary Examiner* — Raymond S Dean
(74) *Attorney, Agent, or Firm* — Conley Rose, P.C.

(57) ABSTRACT

A device searching method includes: a first device obtains a relative location between a second device and the first device based on location information of the first device and the location information of the second device; if it is determined, based on the relative location, that the second device is not within a shooting range of the first device, the first device indicates to move the first device toward the second device until the second device is within the shooting range of the first device; and the first device highlights the area in which the second device is located in the shooting range of the first device.

21 Claims, 18 Drawing Sheets

(56) References Cited

U.S. PATENT DOCUMENTS

| | | | |
|---|---|---|---|
| 2016/0055628 A1* | 2/2016 | Hayashi | H04N 5/35721 382/254 |
| 2016/0057331 A1* | 2/2016 | Yoo | G06V 10/60 348/370 |
| 2016/0171777 A1 | 6/2016 | Todeschini et al. | |
| 2016/0327946 A1 | 11/2016 | Koga et al. | |
| 2016/0330584 A1 | 11/2016 | Akpinar et al. | |
| 2016/0359659 A1* | 12/2016 | MacGougan | G06F 11/0793 |
| 2016/0381510 A1* | 12/2016 | Reynolds | H04B 17/27 455/456.1 |
| 2017/0006425 A1 | 1/2017 | Tang et al. | |
| 2017/0195985 A1 | 7/2017 | Zhao et al. | |
| 2017/0228935 A1 | 8/2017 | Foster et al. | |
| 2017/0303089 A1 | 10/2017 | Wang et al. | |
| 2017/0307722 A1* | 10/2017 | Zhang | G01S 5/0249 |
| 2018/0295337 A1* | 10/2018 | Hicks | H04N 13/344 |
| 2019/0095212 A1* | 3/2019 | Yang | G06N 3/08 |
| 2019/0246238 A1 | 8/2019 | Crutchfield et al. | |
| 2022/0201428 A1 | 6/2022 | Ertan et al. | |
| 2022/0329976 A1 | 10/2022 | He et al. | |

FOREIGN PATENT DOCUMENTS

| | | |
|---|---|---|
| CN | 105928504 A | 9/2016 |
| CN | 106535116 A | 3/2017 |
| CN | 106878949 A | 6/2017 |
| CN | 107977625 A | 5/2018 |
| CN | 108366338 A | 8/2018 |
| CN | 108459595 A | 8/2018 |
| CN | 108683996 A | 10/2018 |
| CN | 109522811 A | 3/2019 |
| CN | 109547921 A | 3/2019 |
| CN | 109640276 A | 4/2019 |
| CN | 110022525 A | 7/2019 |
| CN | 110532839 A | 12/2019 |
| CN | 110930692 A | 3/2020 |
| CN | 111148027 A | 5/2020 |
| CN | 111436020 A | 7/2020 |
| CN | 112087649 A | 12/2020 |
| CN | 113796099 A | 12/2021 |
| EP | 3072432 A1 | 9/2016 |
| JP | 3103691 U | 8/2004 |
| JP | 2006092128 A | 4/2006 |
| WO | 2013192619 A2 | 12/2013 |

* cited by examiner

DEVICE SEARCHING METHOD AND ELECTRONIC DEVICE

CROSS-REFERENCE TO RELATED APPLICATIONS

This is a continuation of International Patent Application No. PCT/CN2021/081517 filed on Mar. 18, 2021, which claims priority to Chinese Patent Application No. 202010779683.0 filed on Aug. 5, 2020. The disclosures of the aforementioned applications are hereby incorporated by reference in their entireties.

TECHNICAL FIELD

This application relates to the artificial intelligence field, and in particular, to a device searching method and an electronic device.

BACKGROUND

Usually, in some scenarios, a case in which a user loses or forgets a device may occur. Usually, when a device A, that is, a lost or forgotten device, is in a power-on state and has a function such as Bluetooth or Wi-Fi, the device A may be connected by using a function such as Bluetooth or Wi-Fi of another device. After the device A is connected to an external device or a cloud server, the external device or the cloud server connected to the device A sends an instruction to the forgotten device, so that the device A produces a prompt tone or vibrates. In this way, a user can find the device A. However, the device A needs to have a vibration function and a sounding function, and needs to be in the power-on state.

SUMMARY

This disclosure provides a device searching method and an electronic device, to label a location of a to-be-searched device in an image based on localization of the to-be-searched device and a shot image. In this way, a user can quickly find a device in an actual application scenario, thereby improving user experience.

In view of this, according to a first aspect, this disclosure provides a device searching method, including: A first device obtains location information of a second device; the first device obtains a relative location between the second device and the first device based on location information of the first device and the location information of the second device; if it is determined, based on the relative location, that the second device is within a shooting range of the first device, the first device shoots a first image; the first device determines an area in which the second device is located in the first image; and the first device highlights the area in which the second device is located in the first image.

Therefore, in this implementation of this disclosure, in a device searching process, the relative location between the first device and the second device may be obtained. If the first device has a shooting function, and the second device is within the shooting range of the first device, an area in which the second device is located may be labeled in a shot image, so that a user can intuitively view a location of the second device. In this way, the user can quickly find a lost device, thereby improving user experience.

In a possible implementation, the first device further displays the entire first image or a part of the first image. Therefore, the user can quickly find the second device by referring to the entire first image or the part of the first image.

In a possible implementation, the method may further include: The first device performs prompting based on the relative location between the second device and the first device.

Therefore, in this implementation of this disclosure, prompting may be further performed based on the relative location between the second device and the first device, so that the user can more accurately find a location of the second device in an actual application scenario based on the relative location. Alternatively, when the first device does not have the shooting function, prompting may be directly performed on a direction and/or a distance of the second device relative to the first device, so that the user can quickly find the lost second device based on prompting, thereby improving user experience.

In a possible implementation, the relative location includes a first distance between the first device and the second device and a first direction of the second device relative to the first device. That the first device performs prompting based on the relative location between the second device and the first device may include: The first device performs prompting on at least one of the first distance and the first direction.

In this implementation of this disclosure, the first device may perform prompting on the distance and the direction of the second device relative to the first device, so that the user can intuitively find the second device based on the distance and the direction of the second device relative to the first device, thereby improving user experience.

In a possible implementation, that the first device performs prompting on at least one of the first distance and the first direction may include: The first device displays at least one of the first distance and the first direction in a display interface; or the first device plays voice guidance, where the voice guidance includes a voice of at least one of the first distance and the first direction.

Therefore, in this implementation of this disclosure, prompting may be performed in the display interface or prompting may be performed in a voice play manner, to flexibly adapt to different scenarios, so that the user can accurately find the second device based on prompting, thereby improving user experience.

In a possible implementation, if the second device is not within the shooting range of the first device, the method may further include: The first device indicates to move the first device toward the second device, until the second device is within the shooting range of the first device.

In this implementation of this disclosure, if the first device has the shooting function, and the second device is not within the shooting range of the first device, prompting may be performed to move the first device, so that the second device is within the shooting range of the first device and the area in which the second device is located is labeled in the shot image. In this way, the user can intuitively view the location of the second device, so that the user can quickly find the lost device, thereby improving user experience.

In a possible implementation, after the first device indicates to move the first device toward the second device, the method may further include: If the first device detects that the first device moves, the first device updates the relative location between the first device and the second device based on real-time location information of the first device, and indicates an updated relative location.

In this implementation of this disclosure, when the first device moves, the relative location between the first device and the second device may be updated in real time. Optionally, prompting may be further performed based on the updated relative location, so that the user can obtain a location change of the second device in time when the first device moves. In this way, the user can find the second device in time, thereby improving user experience.

In a possible implementation, if the second device is within the shooting range of the first device, and the second device is shielded by an obstacle within the shooting range, that the first device determines an area in which the second device is located in the first image may include: The first device calculates, based on the relative location, an area in which the shielded second device is located in the first image.

In this implementation of this disclosure, even if the second device is shielded, the area of the second device in the first image may also be calculated based on the relative location, so that the user can find the second device in time, thereby improving user experience.

In a possible implementation, that a first device obtains location information of a second device may include: The first device establishes a communication connection to the second device; and the first device receives the location information sent by the second device.

In this implementation of this disclosure, the first device may establish a communication connection to the second device, to directly receive the location information sent by the second device.

In a possible implementation, that a first device obtains location information of a second device may include: The first device establishes a communication connection to a third device; and the first device receives the location information of the second device sent by the third device, where the location information is sent to the third device by the second device.

In this implementation of this disclosure, the first device may obtain the location information of the second device by using the third device. Even if the first device does not establish a connection to the second device, the first device can still obtain the location information of the second device, so that prompting can be subsequently performed on the area in which the second device is located in the image. In this way, the user can quickly find the second device, thereby improving user experience.

In a possible implementation, before the first device determines the area in which the second device is located in the first image, the method further includes: The first device obtains a device attribute of the second device, where the device attribute includes a type or an appearance of the second device.

In this implementation of this disclosure, the first device may obtain the device attribute of the second device, for example a device type or appearance, so that the second device can be accurately identified in the first image, and the area in which the second device is located can be highlighted more accurately in the image. In this way, the user can quickly find the second device, thereby improving user experience.

According to a second aspect, this disclosure provides an electronic device, including: an obtaining module, configured to obtain location information of a second device; a calculation module, configured to obtain a relative location between the second device and the electronic device based on location information of the electronic device and the location information of the second device; a shooting module, configured to: if it is determined, based on the relative location, that the second device is within a shooting range of the electronic device, shoot a first image; a determining module, configured to determine, by using the electronic device, an area in which the second device is located in the first image; and a prompting module, configured to highlight the area in which the second device is located in the first image.

In a possible implementation, the prompting module is further configured to perform prompting based on the relative location between the second device and the electronic device.

In a possible implementation, the relative location includes a first distance between the electronic device and the second device and a first direction of the second device relative to the electronic device. The prompting module is specifically configured to perform, by using the electronic device, prompting on at least one of the first distance and the first direction.

In a possible implementation, the prompting module is specifically configured to: display at least one of the first distance and the first direction in a display interface; or play voice guidance, where the voice guidance includes a voice of at least one of the first distance and the first direction.

In a possible implementation, the prompting module is further configured to: if the second device is not within the shooting range of the electronic device, indicate to move the electronic device toward the second device, until the second device is within the shooting range of the electronic device.

In a possible implementation, the calculation module is further configured to: if it is detected that the electronic device moves, update the relative location between the electronic device and the second device based on real-time location information of the electronic device, to obtain an updated relative location.

The prompting module is further configured to indicate the updated relative location, that is, perform prompting on the updated relative location.

In a possible implementation, if the second device is within the shooting range of the electronic device, and the second device is shielded by an obstacle within the shooting range, the determining module is further configured to calculate, based on the relative location, an area in which the shielded second device is located in the first image.

In a possible implementation, the electronic device further includes a transceiver module, configured to: establish a communication connection to the second device, and receive the location information sent by the second device.

In a possible implementation, the transceiver module is further configured to: establish a communication connection to a third device, and receive the location information of the second device sent by the third device.

In a possible implementation, before the determining module determines the area in which the second device is located in the first image, the transceiver module is further configured to obtain a device attribute of the second device, where the device attribute of the second device includes a type or an appearance of the second device.

According to a third aspect, this disclosure provides an electronic device, including: a processor, configured to: obtain location information of a second device, and obtain a relative location between the second device and the electronic device based on the location information of the second device, where the processor is further configured to: if it is determined, based on the relative location, that the second device is within a shooting range of a camera of the electronic device, indicate the camera to shoot a first image, and determine an area in which the second device is located in the first image; and a display, configured to highlight the area in which the second device is located in the first image.

In a possible implementation, the processor is further configured to indicate to perform prompting based on the relative location between the second device and the electronic device.

In a possible implementation, the relative location includes a first distance between the electronic device and the second device and a first direction of the second device relative to the electronic device.

The processor is specifically configured to indicate to perform prompting on at least one of the first distance and the first direction.

In a possible implementation, the display is further configured to display at least one of the first distance and the first direction under indication of the processor; or the electronic device further includes a speaker, configured to play voice guidance under indication of the processor, where the voice guidance includes a voice of at least one of the first distance and the first direction.

In a possible implementation, the processor is further configured to: if the second device is not within the shooting range of the electronic device, indicate to move the electronic device toward the second device, until the second device is within the shooting range of the electronic device; and the display is further configured to display, under indication of the processor, prompting information indicating to move the electronic device toward the second device, until the second device is within the shooting range of the electronic device, or the electronic device further includes a speaker, configured to play, under indication of the processor, prompting information indicating to move the electronic device toward the second device, until the second device is within the shooting range of the electronic device.

In a possible implementation, the processor is further configured to: if detecting that the electronic device moves, update the relative location between the electronic device and the second device based on real-time location information of the electronic device, to obtain an updated relative location; and the display is further configured to display the updated relative location, or the speaker is further configured to play a voice including the updated relative location.

In a possible implementation, if the second device is within the shooting range of the electronic device, and the second device is shielded by an obstacle within the shooting range, the processor is further configured to calculate, based on the relative location, an area in which the shielded second device is located in the first image.

In a possible implementation, the electronic device further includes a transceiver, configured to: establish a communication connection to the second device, and receive the location information sent by the second device.

In a possible implementation, the transceiver is further configured to: establish a communication connection to a third device, and receive the location information of the second device sent by the third device.

In a possible implementation, before the processor determines the area in which the second device is located in the first image, the transceiver is further configured to obtain a device attribute of the second device, where the device attribute of the second device includes a type or an appearance of the second device.

According to a fourth aspect, this disclosure provides an electronic device. The electronic device includes a display, a memory, and one or more processors, where the memory stores code of a graphical user interface of an application, and the one or more processors are configured to execute the code of the graphical user interface (GUI) stored in the memory, to display the graphical user interface in the display; and the graphical user interface is configured to: display information about a to-be-searched second device in the display; and highlight, based on an obtained first image and in the display, an area in which the second device is located in the first image, where the first image is obtained as follows: in response to an operation on the second device, obtaining location information of the second device, and obtaining a relative location between the second device and the electronic device based on the location information of the second device; and if it is determined, based on the relative location, that the second device is within a shooting range of the electronic device, shooting the first image.

In a possible implementation, the GUI is further configured to display the relative location in the display.

In a possible implementation, the relative location includes a first distance between the electronic device and the second device and a first direction of the second device relative to the electronic device. The GUI is specifically configured to display at least one of the first distance and the first direction in the display.

In a possible implementation, if the second device is not within the shooting range of the electronic device, the GUI is further configured to: display, in the display, prompting information indicating to move the electronic device toward the second device, until the second device is within the shooting range of the electronic device.

In a possible implementation, after the electronic device performs prompting based on the relative location between the second device and the electronic device, if the one or more processors detect that the electronic device moves, the one or more processors update the relative location between the electronic device and the second device based on real-time location information of the electronic device, to obtain an updated relative location. The GUI is further configured to display the updated relative location in the display.

According to a fifth aspect, an embodiment of this disclosure provides an electronic device, including a processor and a memory. The processor and the memory are interconnected through a line, and the processor invokes program code in the memory, to perform a processing-related function in the device searching method in any one of the first aspect or the possible implementations of the first aspect. Optionally, the electronic device may be a chip.

According to a sixth aspect, an embodiment of this disclosure provides an electronic device. The electronic device may also be referred to as a digital processing chip or a chip. The chip includes a processing unit and a communication interface. The processing unit obtains program instructions through the communication interface, and the program instructions are executed by the processing unit, so that the processing unit is configured to perform a processing-related function in any one of the first aspect or the possible implementations of the first aspect.

According to a seventh aspect, an embodiment of this disclosure provides a computer-readable storage medium, including instructions. When the instructions are run on a computer, the computer is enabled to perform the method in any one of the first aspect or the possible implementations of the first aspect.

According to an eighth aspect, an embodiment of this disclosure provides a computer program product including instructions. When the computer program product runs on a computer, the computer is enabled to perform the method in any one of the first aspect or the possible implementations of the first aspect.

DESCRIPTION OF EMBODIMENTS

The following describes the technical solutions in embodiments of this disclosure with reference to the accompanying drawings in embodiments of this disclosure. It is clear that the described embodiments are merely some but not all of the embodiments of this disclosure. All other embodiments obtained by a person skilled in the art based on embodiments of this disclosure without creative efforts shall fall within the protection scope of this disclosure.

Figure 1:
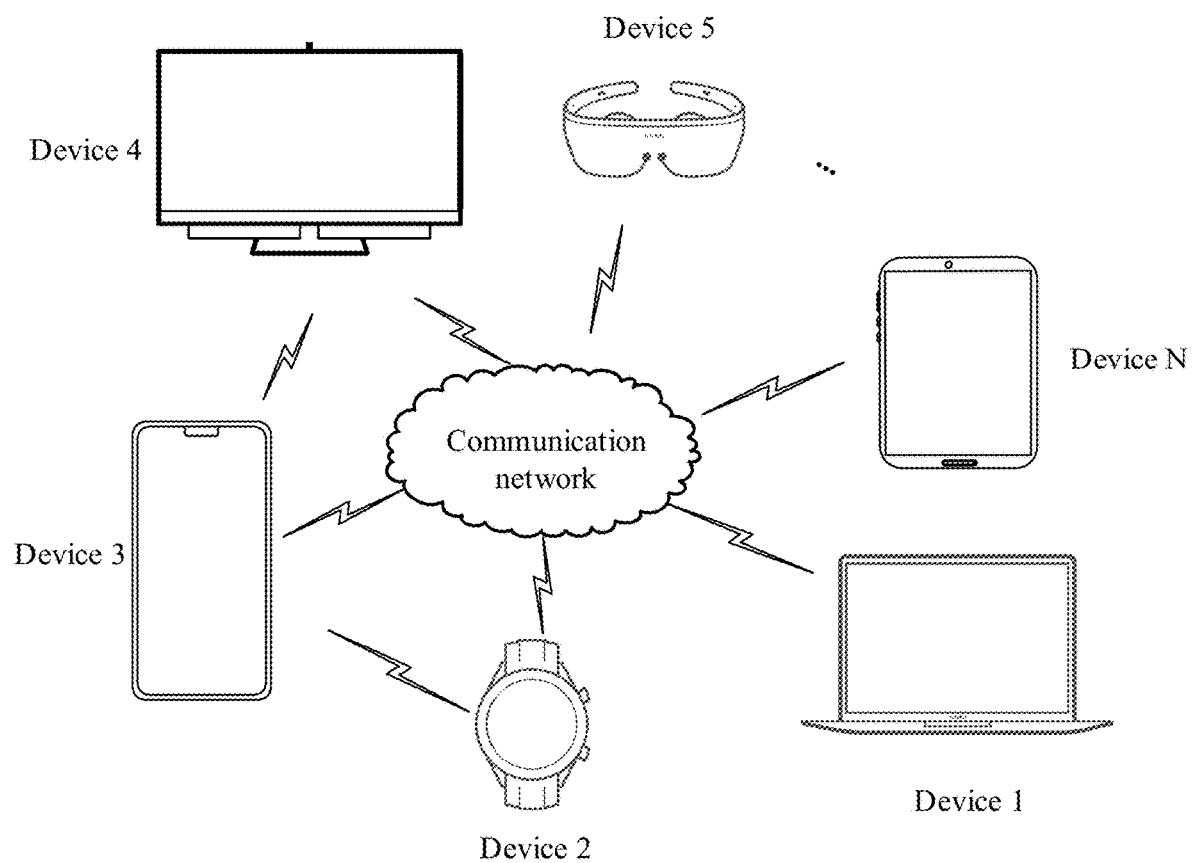
FIG. 1 is a schematic diagram of a network architecture according to this disclosure.

First, for a network architecture applied to a device searching method provided in this disclosure, refer to FIG. 1. The network architecture includes a plurality of electronic devices (for example, a device 1 to a device N shown in FIG. 1), and the electronic devices may be connected to each other.

The electronic device in this disclosure may include but is not limited to: an intelligent mobile phone, a television, a tablet computer, a wristband, a head-mounted display device (HMD), an augmented reality (AR) device, a mixed reality (MR) device, a cellular phone, a smartphone, a personal digital assistant (PDA), an in-vehicle terminal, a laptop computer, a personal computer (PC), and the like. Certainly, in the following embodiments, specific forms of these electronic devices are not limited. It may be understood that, the first device, the second device, the third device, or the like mentioned in the following implementations of this disclosure may be any electronic device in the foregoing.

The plurality of electronic devices may establish a connection by using a wireless network or a wired network. The wireless network includes but is not limited to any one or more of a 5th-generation mobile communication technology (5G) system, a long term evolution (LTE) system, a global system for mobile communications (GSM), a code division multiple access (CDMA) network, a wideband code division multiple access (WCDMA) network, wireless fidelity (Wi-Fi), Bluetooth, ZigBee, a radio frequency identification (RFID) technology, long range (Lora) wireless communication, and near-field communication (NFC).

In the network architecture shown in FIG. 1, data may be mutually transmitted among the electronic devices directly or based on an established communication connection. For example, location information of each electronic device is transmitted to all devices or a specified electronic device in the network architecture directly or through the established communication connection.

It should be understood that, in the network architecture shown in FIG. 1, one of the electronic devices may be selected as a management device, to manage the devices in the network architecture, for example, to add an operation such as verification, online status statistics, location statistics, bandwidth allocation, or traffic statistics. Certainly, alternatively, there may be no management device, and the electronic devices may establish a connection, so that information about another device, for example, location information and a device attribute (such as a device type or a device appearance), is directly or indirectly obtained from the network architecture through an established connection.

Figure 2:
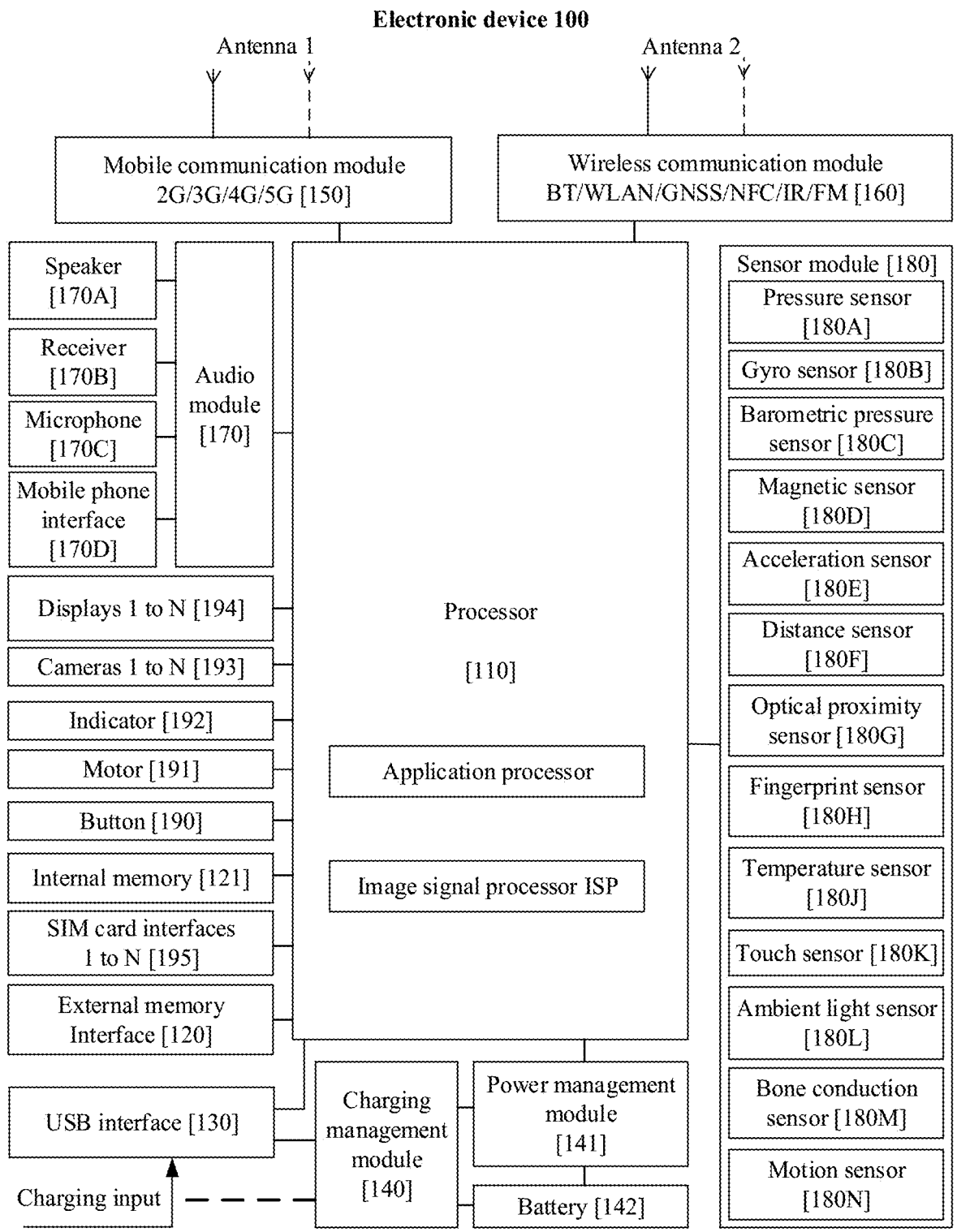
FIG. 2 is a schematic diagram of a structure of an electronic device according to this disclosure.

For example, refer to FIG. 2. The following uses a specific structure as an example to describe a structure of an electronic device provided in this disclosure.

The electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, a motion sensor 180N, and the like.

It may be understood that the structure shown in embodiments does not constitute a specific limitation on the electronic device 100. In other embodiments of this disclosure, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory, to avoid repeated access and reduce waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse-code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus, and converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the Bluetooth headset.

The MIPI interface may be configured to connect the processor 110 to a peripheral component, for example, the display 194 or the camera 193. The MIPI interface includes a camera serial interface (CSI), a display serial interface (DSI), or the like. In some embodiments, the processor 110 communicates with the camera 193 through the CSI interface, to implement a shooting function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be used to connect to a charger for charging the electronic device 100, may be used to transmit data between the electronic device 100 and a peripheral device, and may also be configured to connect to a headset to play audio through the headset. In addition, the port may be further used to connect to another electronic device, for example, an AR device. It should be understood that, the USB interface 130 herein may also be replaced with another interface, for example, an interface that may implement charging or data transmission, such as a type-c interface or a lighting interface. The USB interface 130 herein is merely used as an example for description.

It may be understood that an interface connection relationship between the modules that is shown in this embodiment is merely an example for description, and does not constitute a limitation on the structure of the electronic device 100. In other embodiments of this disclosure, the electronic device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further reused, to improve antenna utilization. For example, the antenna 1 may be reused as a diversity antenna in a wireless local area network. In some other embodiments, an antenna may be used in combination with a tuning switch.

The mobile communication module 150 may provide a wireless communication solution that includes 2G/3G/4G/5G and the like and that is applied to the electronic device 100. The mobile communication module 150 may include at least one filter, a switch, a power amplifier, a low-noise amplifier (LNA), and the like. The mobile communication module 150 may receive an electromagnetic wave through the antenna 1, perform processing such as filtering and amplification on the received electromagnetic wave, and transfer a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules in the mobile communication module 150 may be disposed in the processor 110. In some embodiments, at least some function modules in the mobile communication module 150 and at least some modules in the processor 110 may be disposed in a same device.

The modem processor may include a modulator and a demodulator. The modulator is configured to modulate a to-be-sent low frequency baseband signal into a medium and high frequency signal. The demodulator is configured to demodulate a received electromagnetic wave signal into a low frequency baseband signal. Then, the demodulator transmits the low frequency baseband signal obtained through demodulation to the baseband processor for processing. The baseband processor processes the low-frequency baseband signal, and then transfers a processed signal to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in the same device as the mobile communication module 150 or another function module.

The wireless communication module 160 may provide a wireless communication solution that includes a wireless local area network (WLAN) (for example, a Wi-Fi network), Bluetooth (BT), a global navigation satellite system (GNSS), frequency modulation (FM), an technology, ultra wideband (UWB), an infrared (IR) technology, or the like and that is applied to the electronic device 100. The wireless communication module 160 may be one or more components that integrate at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert an amplified signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include but is not limited to: a 5th-generation mobile communication technology (5G) system, a Global System for Mobile Communications (GSM), a general packet radio service (GPRS), code-division multiple access (CDMA), wideband code-division multiple access (WCDMA), time-division synchronous code-division multiple access (TD-SCDMA), Long-Term Evolution (LTE), Bluetooth, a global navigation satellite system (GNSS), Wi-Fi, NFC, FM, Zigbee, a radio frequency identification (RFID) technology, an infrared (IR) technology, and/or the like. The GNSS may include a global positioning system (GPS), a global navigation satellite system (GLONASS), a Beidou navigation satellite system (BDS), a quasi-zenith satellite system (QZSS), and/or a satellite based augmentation system (SBAS).

In some implementations, the electronic device 100 may also include a wired communication module (which is not shown in FIG. 1), or the mobile communication module 150 or the wireless communication module 160 herein may be replaced with a wired communication module (which is not shown in FIG. 1). The wired communication module may enable the electronic device to communicate with another device by using a wired network. The wired network may include but is not limited to one or more of the following: an optical transport network (OTN), a synchronous digital hierarchy (SDH), a passive optical network (PON), Ethernet, Flexible Ethernet (FlexE), or the like.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid-crystal display (LCD), an organic light-emitting diode (OLED), an active-matrix organic light-emitting diode (AMOLED), a flex light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

The electronic device 100 can implement a shooting function by using the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert a processed electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. Therefore, the electronic device 100 may play or record videos in a plurality of coding formats, for example, Moving Picture Experts Group (MPEG)-1, MPEG-2, MPEG-3, and MPEG-4.

The NPU is a neural network (NN) computing processor that rapidly processes input information by referring to a structure of a biological neural network, for example, by referring to a transfer mode between human brain neurons, and can further perform self-learning continuously. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data, and an address book) created in a process of using the electronic device 100, and the like. In addition, the internal memory 121 may include a high-speed random access memory, and may further include a nonvolatile memory, for example, at least one magnetic disk storage device, a flash memory, or a universal flash storage (UFS). The processor 110 runs the instructions stored in the internal memory 121 and/or the instructions stored in the memory disposed in the processor, to perform various function applications of the electronic device 100 and process data.

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound by moving the mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing an SMS message is executed. When a touch operation whose touch operation intensity is greater than or equal to the first pressure threshold is performed on an application icon "Messages", an instruction for creating an SMS message is executed.

The gyroscope sensor 180B may be configured to determine a motion posture of the electronic device 100. In some embodiments, an angular velocity of the electronic device 100 around three axes (namely, axes X, Y, and Z) may be determined by using the gyroscope sensor 180B. The gyroscope sensor 180B may be configured to implement image stabilization during shooting. For example, when a shutter is pressed, the gyroscope sensor 180B detects an angle at which the electronic device 100 jitters, obtains, through calculation based on the angle, a distance for which a lens module needs to compensate, and allows the lens to cancel out the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect magnitude of accelerations in various directions (usually on three axes) of the electronic device 100, and may detect a magnitude and a direction of gravity when the electronic device 100 is still. The acceleration sensor 180E may be further configured to recognize a posture of the electronic device, and is used in screen switching between a landscape mode and a portrait mode, a pedometer, or another application.

The distance sensor 180F is configured to measure a distance. The electronic device 100 may measure the distance in an infrared or a laser manner. In some embodiments, in a shooting scenario, the electronic device 100 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during shooting. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a "touch control device". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal of the vibration bone of the vocal-cord part obtained by the bone conduction sensor 180M, to implement a voice function. The application processor may parse heart rate information based on the blood pressure beating signal obtained by the bone conduction sensor 180M, to implement a heart rate detection function.

The motion sensor 180N may be configured to: detect a moving object within a shooting range of a camera, and collect a moving contour, a moving track, or the like of the moving object. For example, the motion sensor 180N may be an infrared sensor, a laser sensor, or a dynamic vision sensor (DVS). The DVS may specifically include a sensor such as a dynamic and active-pixel vision sensor (Davis), an asynchronous time-based image sensor (ATIS), or a CeleX sensor. The DVS draws on a characteristic of biological vision. Each pixel simulates one neuron and independently responds to a relative change in light intensity ("light intensity" for short hereinafter). When the relative change in the light intensity exceeds a threshold, a pixel outputs an event signal, where the event signal includes a location of the pixel, a time stamp, and feature information of the light intensity.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

It should be noted that, in some actual application scenarios, the electronic device may include more or fewer components than those shown in FIG. 2. Specifically, a component quantity may be adjusted based on an actual application scenario. This is not limited in this disclosure.

The foregoing provides an example description for a hardware structure of the electronic device provided in this disclosure. A system that may be loaded on the electronic device may include iOS®, Android®, Microsoft®, Linux®, HarmonyOS, another operating system, or the like. This is not limited in this embodiment of this disclosure.

Figure 3:
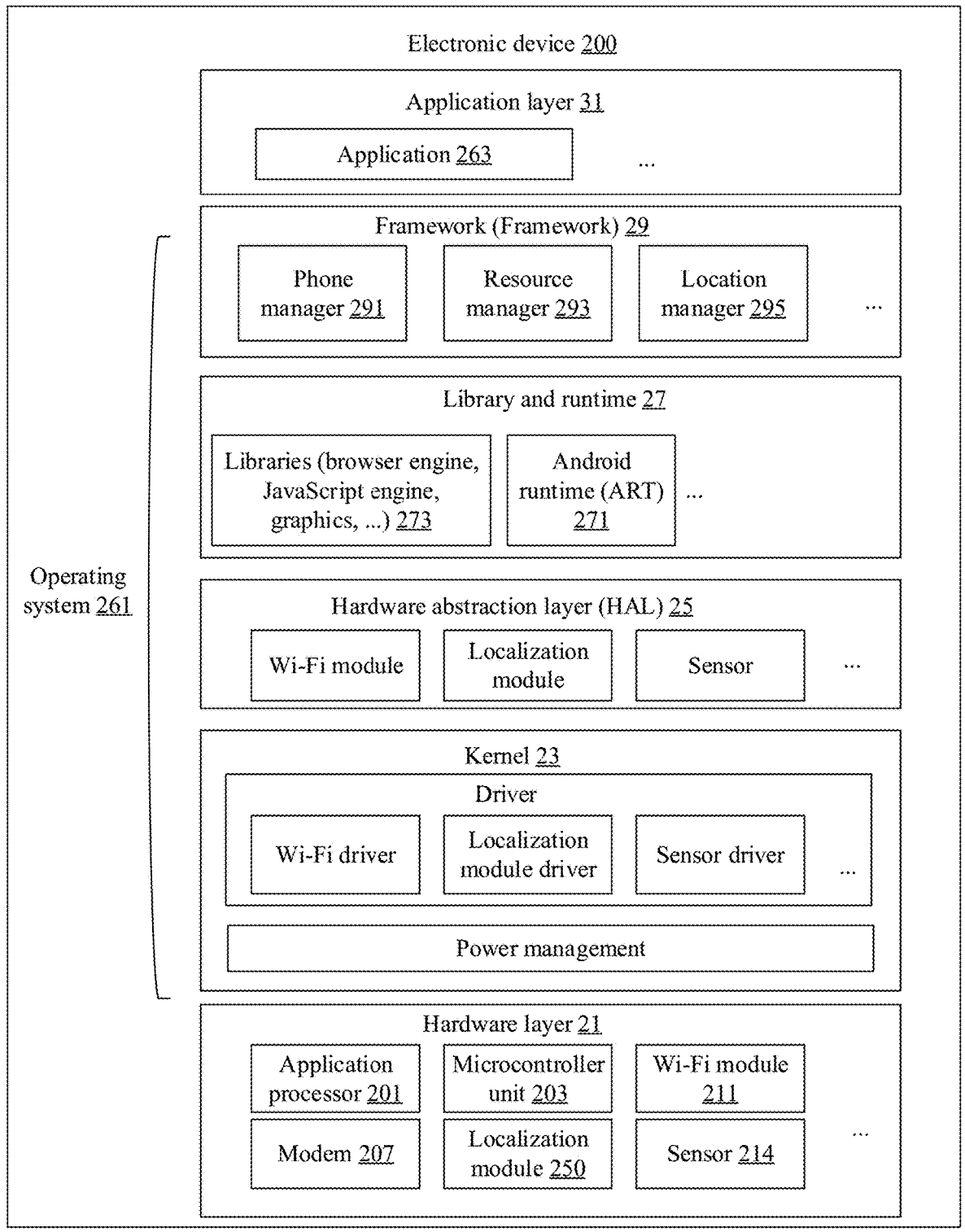
FIG. 3 is a schematic diagram of a structure of another electronic device according to this disclosure.

An electronic device 200 on which an Android® operating system is loaded is used as an example. As shown in FIG. 3, the electronic device 200 may be logically divided into a hardware layer 21, an operating system 261, and an application layer 31. The hardware layer 21 includes hardware resources such as an application processor 201, a microcontroller unit 203, a modem 207, a Wi-Fi module 211, a sensor 214, and a localization module 250. The application layer 31 includes one or more applications, for example, an application 263. The application 263 may be any type of application such as a social application, an e-commerce application, or a browser, or may be an object searching APP, so as to perform the device searching method provided in this disclosure, to search for a device that is lost by a user. The operating system 261 is used as software middleware between the hardware layer 21 and the application layer 31, and is a computer program for managing and controlling hardware and software resources.

In an embodiment, the operating system 261 includes a kernel 23, a hardware abstraction layer (hardware abstraction layer, HAL) 25, library and runtime (libraries and runtime) 27, and a framework (framework) 29. The kernel 23 is configured to provide an underlying system component and a service, for example, power management, memory management, thread management, or a hardware driver. The hardware driver includes a Wi-Fi driver, a sensor driver, a positioning module driver, and the like. The hardware abstraction layer 25 encapsulates a kernel driver, provides an interface for the framework 29, and shields implementation details of a lower layer. The hardware abstraction layer 25 runs in user space, and the kernel driver runs in kernel space.

The library and runtime 27 is also referred to as a runtime library, and provides a library file and an execution environment required by an executable program during running. The library and runtime 27 includes Android runtime (ART) 271, a library 273, and the like. The ART 271 is a virtual machine or a virtual machine instance that can convert bytecode of an application into machine code. The library 273 is a program library that provides support for the executable program during running, and includes a browser engine (for example, webkit), a script execution engine (for example, a JavaScript engine), a graphics processing engine, and the like.

The framework 29 is configured to provide various basic common components and services, such as window management and location management, for an application in the application layer 31. The framework 29 may include a phone manager 291, a resource manager 293, a location manager 295, and the like.

All functions of the components in the operating system 261 described above may be implemented by the application processor 201 by executing programs stored in memory.

A person skilled in the art may understand that the electronic device 200 may include fewer or more components than those shown in FIG. 3, and the electronic device shown in FIG. 3 includes only components more related to a plurality of implementations disclosed in embodiments of this disclosure.

The following describes in detail a device searching method provided in this disclosure based on the network architecture and the electronic device provided in FIG. 1 to FIG. 3.

Figure 4:
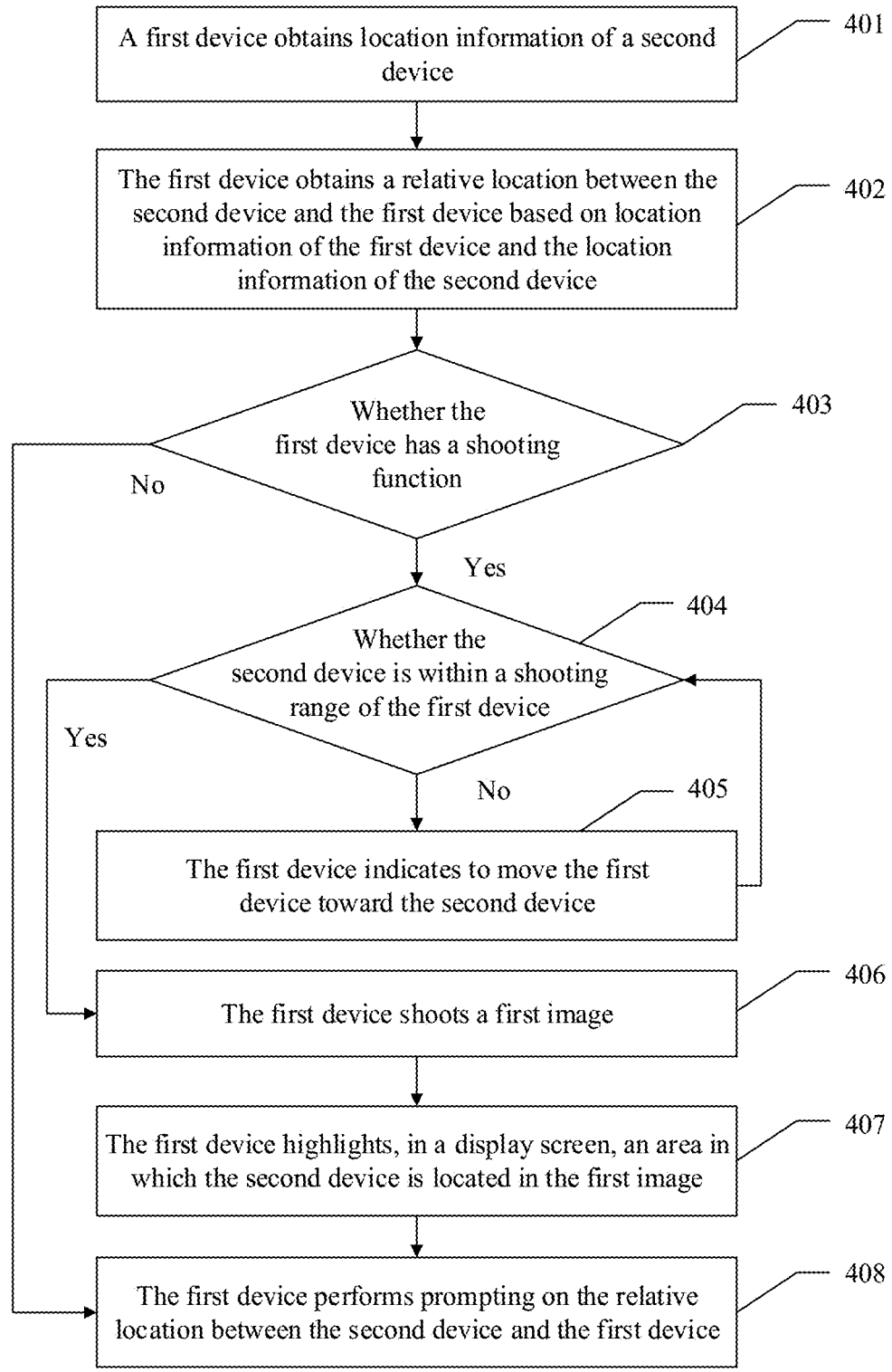
FIG. 4 is a schematic flowchart of a device searching method according to this disclosure.

First, FIG. 4 is a schematic flowchart of a device searching method according to this disclosure. Details are described as follows.

401. A first device obtains location information of a second device.

The first device may learn of a location of the second device based on the location information of the second device. There may be a plurality of manners for the first device to obtain the location information of the second device. Specifically, for example, the first device may find the location information of the second device from stored data, or may receive the location information sent by the second device after establishing a connection to the second device, or a third device forwards the location information to the first device after the second device sends the location information to the third device.

For example, in some scenarios, there are electronic devices such as a wristband, a mobile phone, a tablet computer, and a smart TV included in a home of a user. After a plurality of electronic devices access a same network or establish a connection to each other, each electronic device may periodically send location information of the electronic device to another electronic device in the same network or an electronic device connected to the electronic device. For example, the wristband may transmit location coordinates of the wristband to the tablet computer or the mobile phone every 5 seconds, or send location coordinates of the wristband to all electronic devices in the same network every 5 seconds.

Specifically, for example, in a possible scenario, after the wristband of the user at a corner of the home sends location information to the tablet computer once, the wristband of the user is powered off due to no remaining power. Then the user holds the mobile phone and enters the home, and the mobile phone accesses a home local area network. In this case, if the user needs to search for a location of the wristband by using the mobile phone, the tablet computer in the same local area network may send the location of the wristband to the mobile phone.

402. The first device obtains a relative location between the second device and the first device based on location information of the first device and the location information of the second device.

After obtaining the location information of the first device and the location information of the second device, the first device may calculate the relative location between the second device and the first device. The relative location may include a direction, a distance, and the like of the second device relative to the first device.

For example, the first device may read a location of the first device, receive the location of the second device, then establish a coordinate system by using the first device as a center, and calculate a difference between the location of the first device and the location of the second device to obtain a location of the second device in the coordinate system, so as to obtain a location vector of the second device in the coordinate system, to calculate the direction and the distance of the second device relative to the first device.

403. Determine whether the first device has a shooting function; and if the first device has the shooting function, perform step 404, or if the first device does not have the shooting function, perform step 408.

Step 403 is an optional step. For example, when determining the second device that needs to be searched for, the first device may obtain a device attribute of the first device. The device attribute may include but is not limited to information such as an appearance, a type, or a function of the first device. Therefore, when the second device that needs to be searched for is determined, whether the first device has the shooting function may be read.

For ease of understanding, it may be briefly understood that, whether the first device has the foregoing camera 193 may be determined. If the first device has the camera, whether the second device is within a shooting range of the first device may be further determined. In other words, step 404 is performed. If the first device does not have the camera, prompting may be performed based on the relative location between the second device and the first device, that is, a location, the direction, or the like of the second device relative to the first device may be indicated. In other words, step 408 is performed.

404. Determine whether the second device is within the shooting range of the first device.

When it is determined that the second device has the shooting function, whether the second device is within the shooting range of the first device may be determined based on the relative location between the second device and the first device. If the second device is within the shooting range of the first device, the first device may directly shoot a first image that includes the second device. In other words, step 406 is performed. If the second device is not within the shooting range of the first device, and the first device is movable, prompting may be performed to move the first device toward the second device, so that the second device is within the shooting range of the first device.

Figure 5:
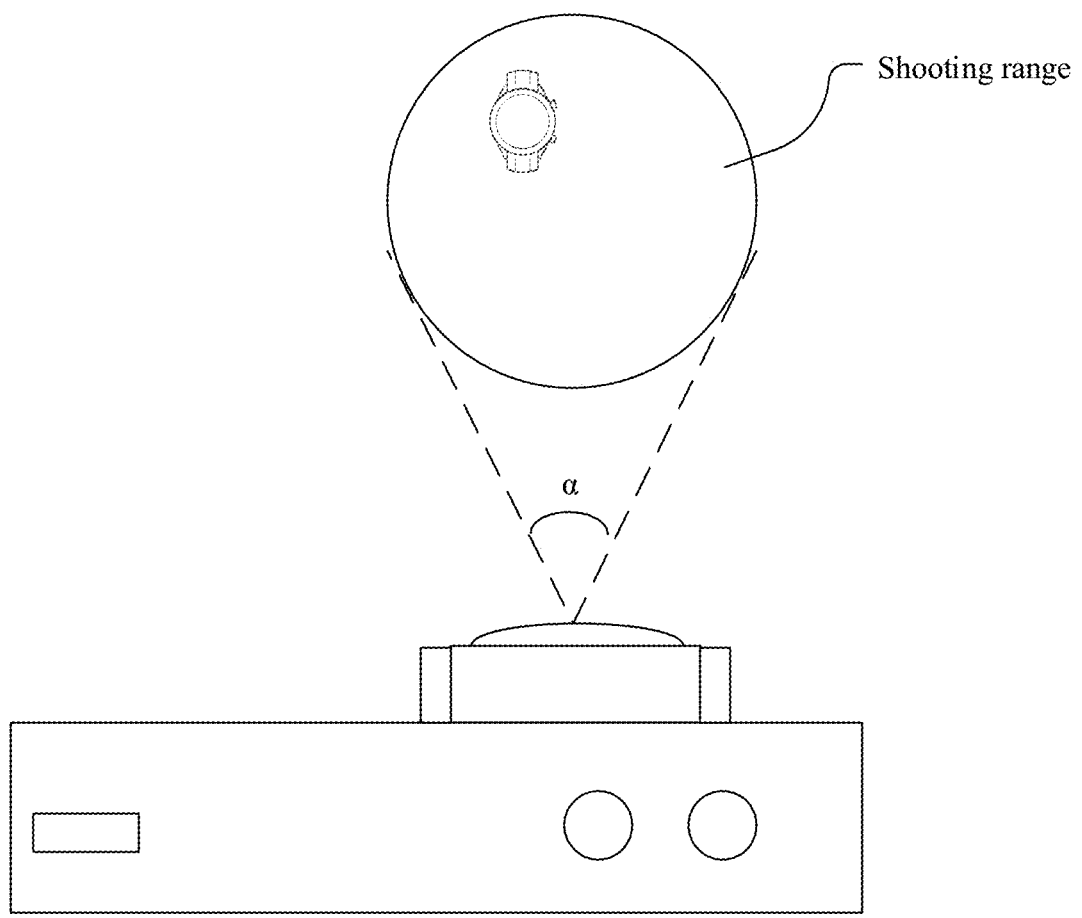
FIG. 5 is a schematic diagram of a shooting range according to this disclosure.

For example, the shooting range may be shown in FIG. 5. The shooting range of the camera is a preset range, and is related to an angle of view a of the camera. Usually, a larger angle of view of the camera indicates a larger shooting range, and a smaller angle of view indicates a smaller shooting range.

405. The first device indicates to move the first device toward the second device.

When the second device is not within the shooting range of the first device, and the first device is movable, it may be indicated to move the first device toward the second device, so that the second device is within the shooting range of the first device.

In this disclosure, that the first device is movable may be that the user may move the first device, that is, the first device may move under action of an external force provided by the user, or may be that the first device is a movable device, for example, a device having a movable component, such as a movable robot or a vacuum cleaning robot. If the first device is a movable device, after it is determined that the second device is not within the shooting range of the first device, the first device moves in a direction of the second device, so that the second device is within the shooting range of the first device.

In addition, when the first device moves, the relative location between the second device and the first device may be updated in real time, and content of prompting information indicating to move the first device may be updated in real time. For example, a direction in which or a distance by which the first device moves toward the second device and that is displayed in a display interface may be updated in real time based on the relative location updated in real time.

406. The first device shoots a first image.

If the second device is within the shooting range of the first device, the first device may turn on the camera to shoot the first image.

Usually, if the second device is not shielded, the first device may perform image recognition on the first device to determine an area in which the second device is located in the first image, or if the second device is shielded, the first device may determine, with reference to the relative location between the first device and the second device, an area in which the second device is located in the first image.

Optionally, if the first device performs image recognition to determine the area in which the second device is located in the first image, before performing image recognition, the first device may obtain a device attribute of the second device, such as a device type, an appearance, or a size of the second device, so that recognition can be performed on the first image based on the device attribute of the second device, to accurately recognize the area in which the second device is located.

407. The first device highlights, in a display, an area in which the second device is located in the first image.

If the first device has a display or is connected to a display, after the first image is obtained and the area of the second device in the first image is determined, the area of the second device in the first image may be highlighted in the display.

Optionally, the first device may further display the entire first image or a part of the first image in the display.

Specifically, on a basis of displaying the first image, the area in which the second device is located may be directly displayed in a form of a thermodynamic diagram, or the area in which the second device is located may be labeled in the first image by using information such as a labeling box, an arrow, or text.

408. The first device performs prompting on the relative location between the second device and the first device.

Prompting may be performed on the location of the second device relative to the first device in a form of prompting information. For example, if the first device does not have the shooting function, prompting may be performed on the relative location between the first device and the second device. Alternatively, for another example, if the first device has the shooting function, but the second device is not within the shooting range of the first device, and the first device is unmovable, prompting may be performed on the relative location between the first device and the second device. For another example, if the second device is within the shooting range of the first device, on a basis of highlighting, in the display, the area in which the second device is located in the first image, prompting may be further performed on the relative location between the second device and the first device, so that the user can find the second device more accurately, thereby improving user experience.

Specifically, the relative location may include a first distance of the second device relative to the first device, a first direction of the second device relative to the first device, or the like. Step 408 may include: performing prompting on the first distance and/or the first direction.

A more specific prompting manner may include but is not limited to: directly displaying the first distance and/or the first direction in the display interface, for example, displaying the first distance and/or the first direction in a form such as text or an arrow; or playing voice guidance, where the voice guidance includes a voice corresponding to the first distance and/or the first direction.

For example, text information, for example, "your wristband is 5 meters to the right", may be displayed in the display interface, or the text may be directly converted into a voice, so that the user can find the wristband based on voice prompting.

Therefore, in this implementation of this disclosure, in a device searching process, the relative location between the first device and the second device may be obtained. If the first device has the shooting function, and the second device is within the shooting range of the first device, an area in which the second device is located may be labeled in a shot image, so that the user can intuitively view the location of the second device. In this way, the user can quickly find a lost device, thereby improving user experience. If the first device has the shooting function, and the second device is not within the shooting range of the first device, prompting may be performed to move the first device, so that the second device is within the shooting range of the first device, and an area in which the second device is located is labeled in the shot image. In this way, the user can intuitively view the location of the second device. In this way, the user can quickly find a lost device, thereby improving user experience. When the first device does not have the shooting function, prompting may be directly performed on the direction and/or the distance of the second device relative to the first device, so that the user can quickly find the lost second device based on prompting, thereby improving user experience.

The foregoing describes in detail a procedure of the device searching method provided in this disclosure. With reference to a graphical user interface (graphical user interface, GUI) provided in this disclosure and a more specific application scenario, the following further describes the procedure of the device searching method provided in this disclosure.

First, a GUI provided in this disclosure is described. The GUI may be used in an electronic device. For the electronic device, refer to related descriptions in FIG. 1 to FIG. 3. The electronic device may include a display, a memory, and one or more processors. The one or more processors are configured to execute one or more computer programs stored in the memory. As described in the steps of the device searching method mentioned in FIG. 4, the GUI is configured to display the display interface in the device searching method by using the display.

The following describes in detail the GUI provided in this disclosure.

The GUI is configured to: display information about a to-be-searched second device, for example, information such as an icon and a name of the second device, in the display; and highlight, based on an obtained first image and in the display, an area in which the second device is located in the first image, where the first image is obtained as follows: in response to an operation on the second device, obtaining location information of the second device, and obtaining a relative location between the second device and the electronic device based on the location information of the second device; and if it is determined, based on the relative location, that the second device is within a shooting range of the electronic device, shooting the first image. In a possible implementation, the GUI may be further configured to display the relative location in the display.

In a possible implementation, the relative location includes a first distance between the electronic device and the second device and a first direction of the second device relative to the electronic device. The GUI is specifically configured to display at least one of the first distance and the first direction in the display.

In a possible implementation, if the second device is not within the shooting range of the electronic device, the GUI is further configured to: display, in the display, prompting information indicating to move the electronic device toward the second device, until the second device is within the shooting range of the electronic device.

In a possible implementation, if the one or more processors detect that the electronic device moves, the one or more processors update the relative location between the electronic device and the second device based on real-time location information of the electronic device, to obtain an updated relative location. The GUI is further configured to display the updated relative location in the display.

Figure 6A:
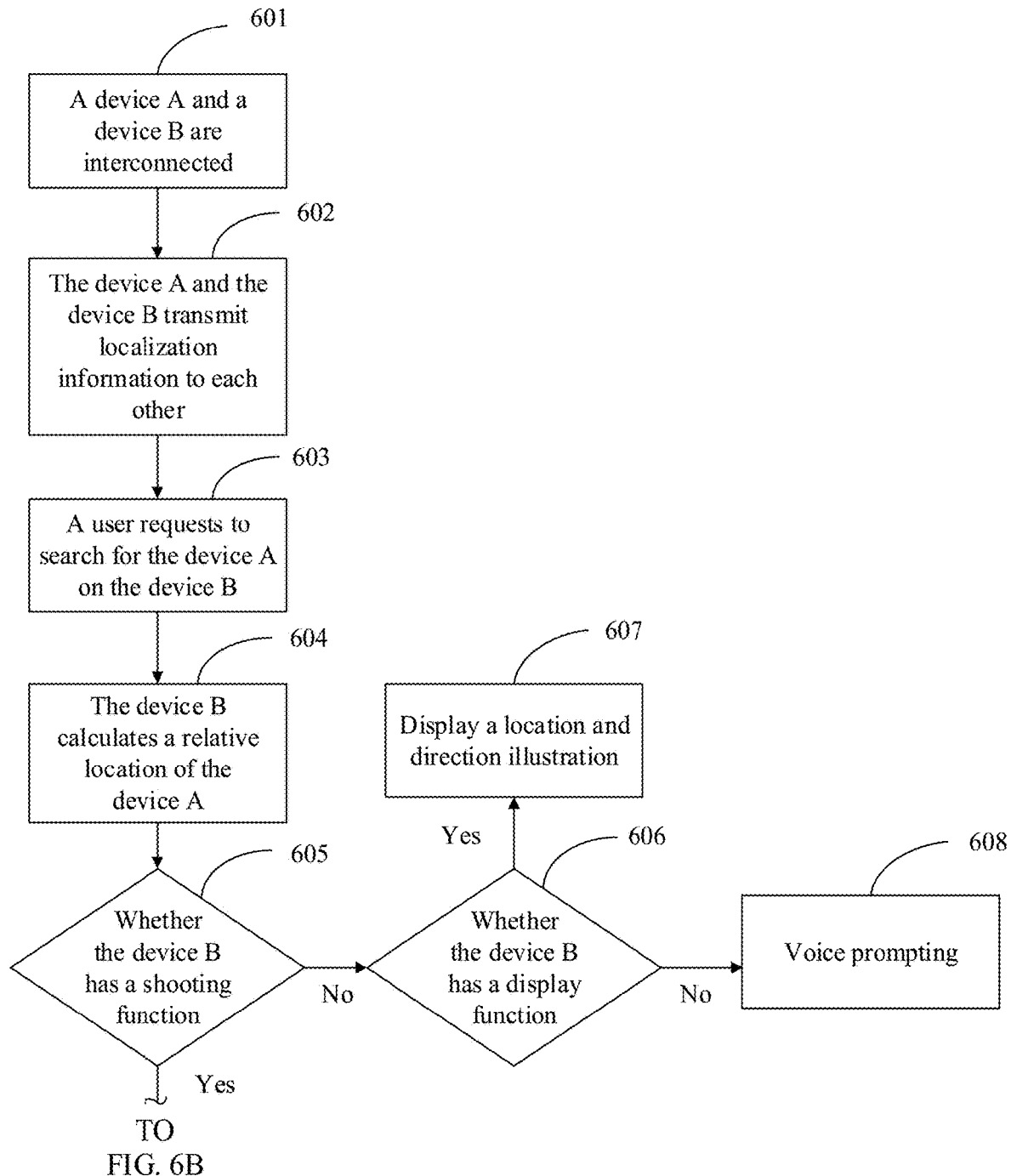
FIG. 6A and FIG. 6B are a schematic flowchart of another device searching method according to this disclosure.
Figure 6B:
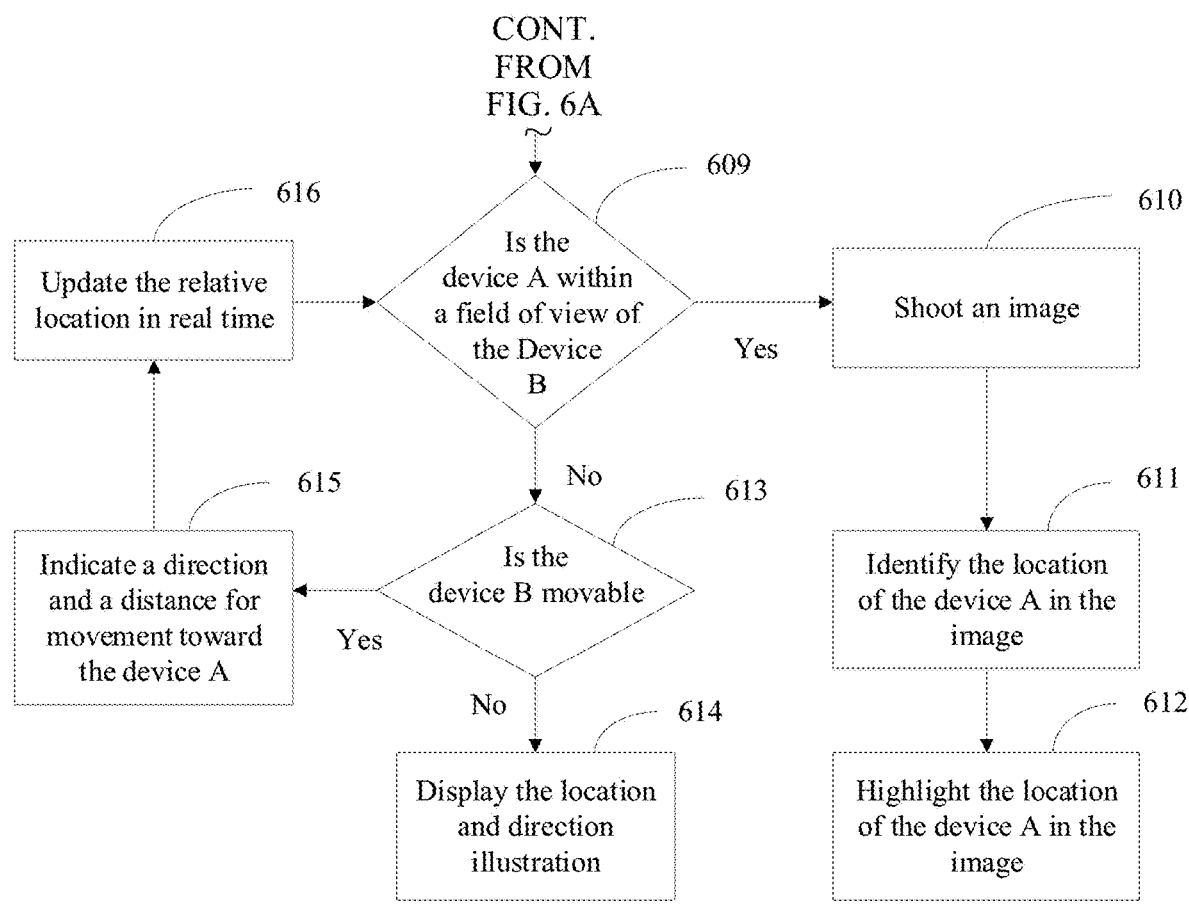

For example, an application scenario of the device searching method and the GUI provided in this disclosure may be shown in FIG. 6A and FIG. 6B. Details are described as follows.

601. A device A and a device B are interconnected.

The device A may be understood as the foregoing second device, and the device B may be understood as the foregoing first device.

Specifically, a communication connection may be established between the device A and the device B in a manner such as UWB, Bluetooth, Zigbee, or NFC.

It should be understood that, in some possible scenarios, there may be no connection established between the device A and the device B, and step 601 is an optional step.

602. The device A and the device B transmit localization information to each other.

If a communication connection is established between the device A and the device B, the device A and the device B may send the localization information to each other through the established communication connection, so as to notify each other of respective locations.

Figure 7:
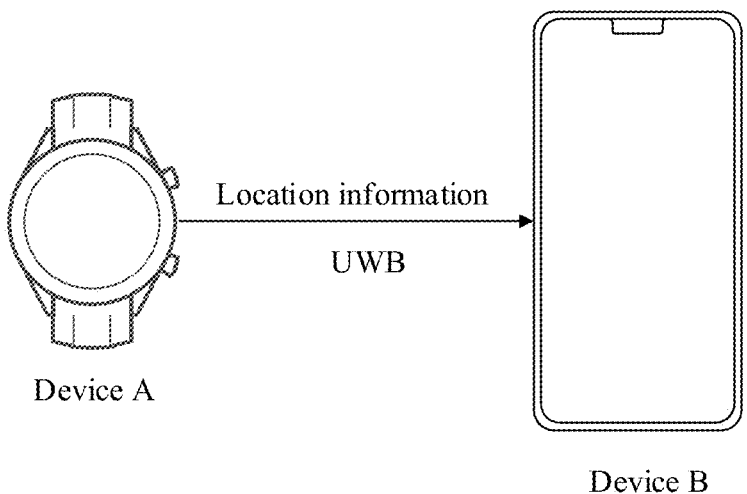
FIG. 7 is a schematic transmission diagram of location information according to this disclosure.

For example, as shown in FIG. 7, the device A may be a wristband, the device B may be a mobile phone, and a UWB connection is established between the wristband and the mobile phone. The wristband may transmit a location of the wristband to the mobile phone through the UWB connection, so that the mobile phone learns of the location of the wristband. Optionally, the location of the wristband may be displayed in a display interface of the mobile phone, so that a user can intuitively observe the location of the wristband in the display interface of the mobile phone.

Figure 8:
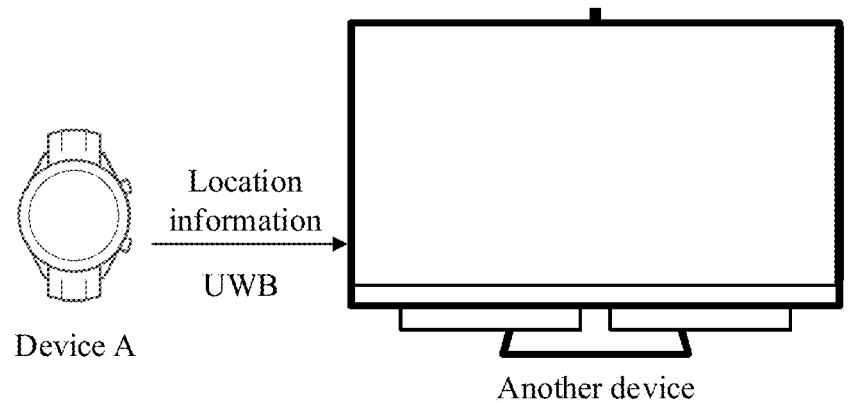
FIG. 8 is another schematic transmission diagram of location information according to this disclosure.
Figure 9:
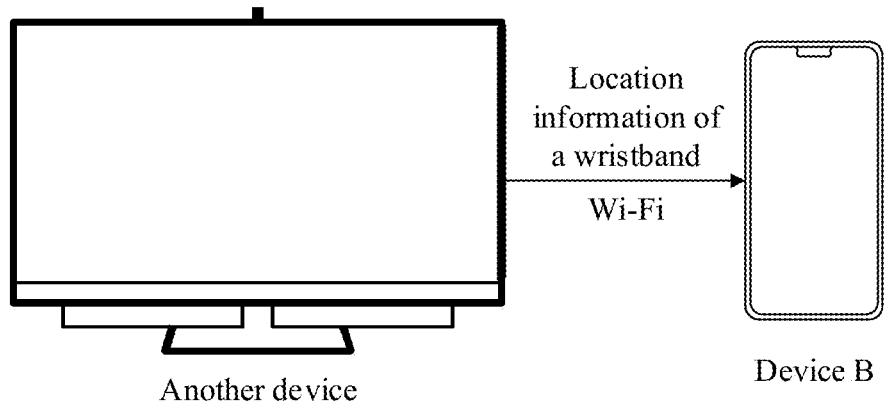
FIG. 9 is another schematic transmission diagram of location information according to this disclosure.

In addition, in some scenarios, there may be no connection established between the device A and the device B. In this case, the device B may obtain location information of the device A by using another device. For example, in some scenarios, the device A may be a wristband, and the device B may be a mobile phone. As shown in FIG. 8, a UWB connection is established between the wristband and a smart TV. The wristband sends location information of the wristband to the smart TV through the UWB connection. As shown in FIG. 9, the smart TV establishes a Wi-Fi connection to the mobile phone, and the smart TV sends the location information of the wristband to the mobile phone, so that the mobile phone learns of a location of the wristband. Specifically, for example, in some scenarios, the wristband at a corner of a home of the user establishes a connection to the smart TV and sends the location information of the wristband to the smart TV, and then the wristband is powered off due to insufficient power. When the user holds the mobile phone and enters the home, the mobile phone may establish a connection to the smart TV by using Wi-Fi, and the smart TV may send last location information sent by the wristband to the mobile phone, so that the mobile phone can also obtain the location information of the wristband while the mobile phone does not establish a connection to the wristband. Subsequently, prompting may be performed on the location of the wristband based on the location information, so that the user can still find the wristband without establishing a connection between the mobile phone and the wristband, thereby improving user experience.

603. A user requests to search for the device A on the device B.

An order for performing step 603 and step 601 is not limited in this disclosure. Step 601 may be first performed, or step 603 may be first performed. In this disclosure, an example in which step 601 is first performed is merely used for description. This imposes no limitation.

Specifically, the user may perform an operation on the device B, to indicate the device B to search for the device A.

Figure 10:
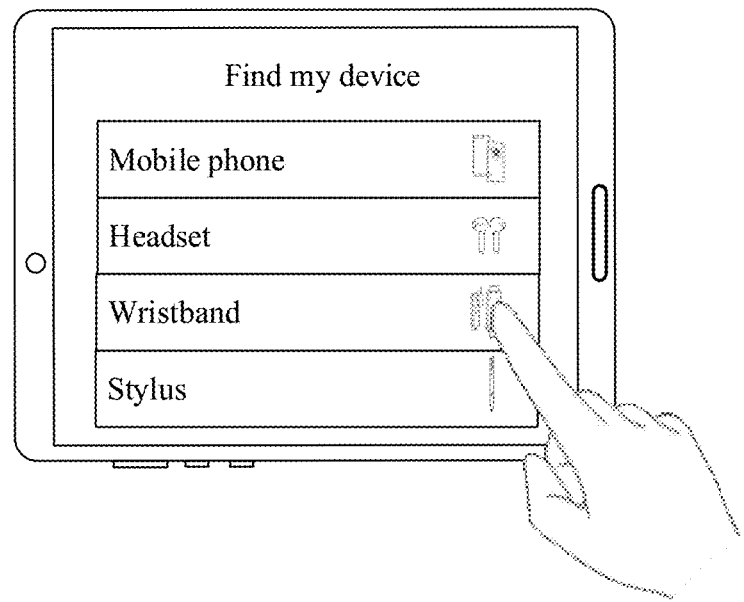
FIG. 10 is a schematic diagram of a GUI according to this disclosure.

For example, a GUI is shown in FIG. 10. A device that accesses a same local area network, for example, a mobile phone, a wristband, a headset, or a stylus, may be displayed in a touchscreen of the device B, and the user may perform a selection operation on the touchscreen to select a device that needs to be searched for.

In some possible scenarios, the device B may not have a display, but may have a speaker, a microphone, and the like, so that the user can control the device B via voice to search for the device A. For example, the device B may be a smart Bluetooth sound box. After waking up the Bluetooth sound box, the user may send a voice control instruction to the Bluetooth sound box, for example, an instruction such as "searching for the wristband" or "searching for the mobile phone", to control the Bluetooth sound box to search for the device A.

604. The device B calculates a relative location of the device A.

After the device A that needs to be searched for is determined, the relative location between the device A and the device B is calculated based on obtained location information of the device A. For example, a direction, a distance, a height, or the like of the device A relative to the device B is calculated.

For example, the relative location between the device A and the device B may be calculated by using various simultaneous localization and mapping (simultaneous localization and mapping, SLAM) algorithms.

For ease of understanding, a manner of calculating the relative location may be simply understood as follows: establishing a coordinate system by using the device B as a center, calculating a difference between a location of the device A and a location of the device B, and determining a coordinate vector of the device A in the coordinate system based on the difference, to obtain the direction and the distance of the device A relative to the device B.

It should be noted that, the following step 605 to step 616 are performed by the device B.

605. Determine whether the device B has a shooting function; and if the device B does not have the shooting function, perform step 606, or if the device B has the shooting function, perform step 609.

Determining whether the device B has the shooting function is determining whether the device B has a camera. If the device B has a camera, whether the device A is within a field of view of the device B may be continuously determined. In other words, step 609 is performed. If the device B does not have a camera, prompting may be performed on the location of the device A in another manner, for example, by performing step 606.

It should be understood that, step 605 is an optional step. In some scenarios in which the device B has the shooting function, a determining step may not be performed, but a next step may be directly performed.

In addition, an order for performing step 605 and step 604 is not limited in this disclosure. Step 604 may be first performed, step 605 may be first performed, or step 604 and step 605 may be simultaneously performed. Specifically, the order may be adjusted based on an actual application scenario. An example in which step 604 is first performed is merely used herein for description. This imposes no limitation.

606. Determine whether the device B has a display function; and if the device B has the display function, perform step 607, or if the device B does not have the display function, perform step 608.

When the device B does not have the shooting function, whether the device B has the display function may be continuously determined. To be specific, whether the device B has or is connected to a display may be determined. If the device B does not have the display function, prompting may be performed on the relative location between the device A and the device B in a voice prompting manner. In other words, step 608 is performed. If the device B has the display function, a display manner or a voice prompting manner may be selected to perform prompting on the relative location between the device A and the device B.

607. Display a location and direction illustration.

Specifically, the location and direction illustration may be displayed in the display of the device B or the display connected to the device B. The location and direction illustration is used to indicate a location of the device A relative to the device B, for example, a distance between the device A and the device B and the direction of the device A relative to the device B.

Figure 11:
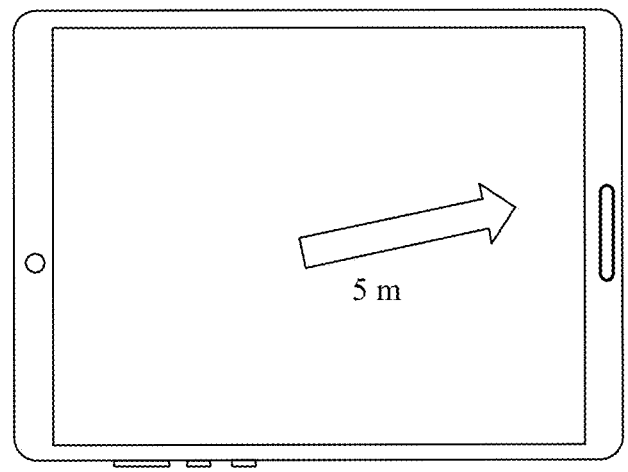
FIG. 11 is a schematic diagram of another GUI according to this disclosure.
Figure 12:
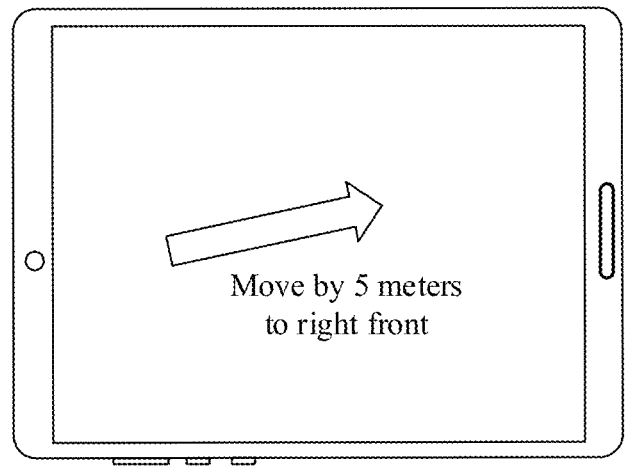
FIG. 12 is a schematic diagram of another GUI according to this disclosure.

For example, a GUI is shown in FIG. 11. The direction of the device A relative to the device B may be indicated in an arrow form in a display interface of the device B, and the distance between the device A and the device B is indicated in a text form. For another example, a GUI is shown in FIG. 12. The direction of the device A relative to the device B may be indicated in an arrow form in a display interface of the device B, and prompting is performed, by using text, on a distance that the user moves toward the direction.

Figure 13A:
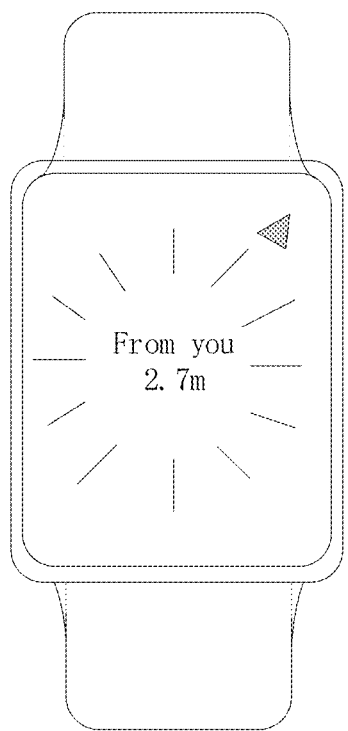
FIG. 13A is a schematic diagram of another GUI according to this disclosure.
Figure 13B:
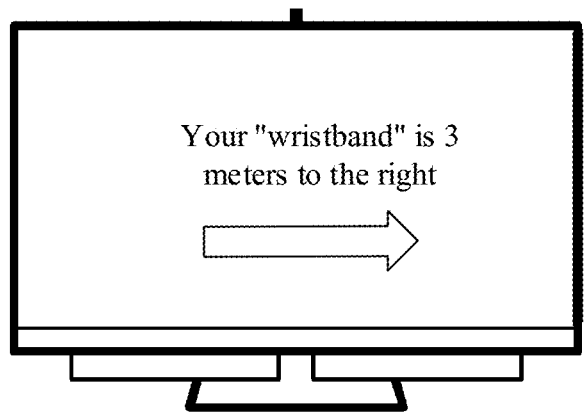
FIG. 13B is a schematic diagram of another GUI according to this disclosure.

For another example, the device B may be a wristband, and a GUI is shown in FIG. 13A. A direction of the device A relative to the wristband may be indicated in a watch face form in the wristband, and a distance between the device A and the wristband is displayed as 2.7 meters in a text form. For another example, a GUI is shown in FIG. 13B. The device B may be a smart TV, and prompting may be performed in the smart TV by using "your 'wristband' is 3 meters to the right", to indicate the user to find the wristband 3 meters to the right of the smart TV.

608. Perform voice prompting.

When the device B does not have the shooting function and does not have the display, voice prompting may be performed on the location and the direction of the device A relative to the device B, or when the user chooses to perform voice prompting, voice prompting may be performed on the location and the direction of the device A relative to the device B. Therefore, even in a scenario in which the device B cannot perform shooting and cannot perform displaying, voice prompting may also be performed on the location of the device A, so that the user can quickly find the device A via a voice, thereby improving user experience.

Figure 14:
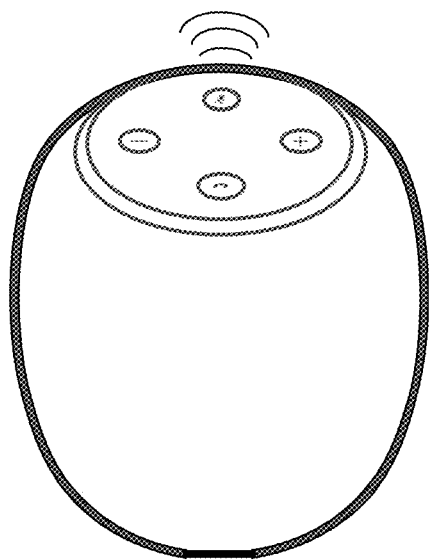
FIG. 14 is a schematic diagram of a voice prompting manner according to this disclosure.

For example, as shown in FIG. 14, the device B may be a Bluetooth sound box. The Bluetooth sound box may play a voice, to indicate, in a voice form, a distance, a direction, or the like of a device that needs to be searched for relative to the Bluetooth sound box.

609. Determine whether the device A is within a field of view of the device B; and if the device A is within the field of view of the device B, perform step 610, or if the device A is not within the field of view of the device B, perform step 613.

Specifically, when it is determined that the device B has the shooting function, whether the device A is within the field of view (namely, the shooting range) of the device B may be determined based on the relative location between the device A and the device B; and if the device A is within the field of view of the device B, the device B may shoot an image, or if the device A is not within the field of view of the device B, prompting may be performed to move the device B, so that the device A is within the field of view of the device B.

Figure 15:
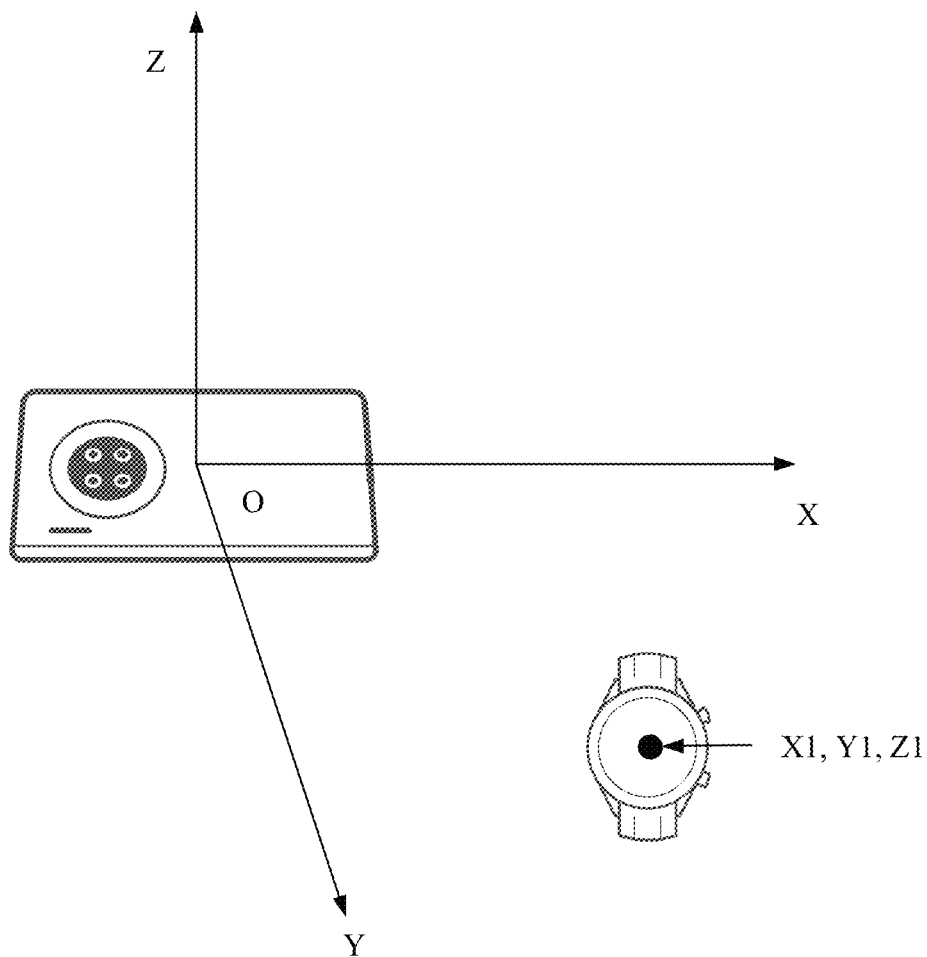
FIG. 15 is a schematic diagram of a coordinate system according to this disclosure.

For example, the device B is a mobile phone. As shown in FIG. 15, the mobile phone establishes a coordinate system by using the mobile phone as a center, and an origin of the coordinate system is a geometric center of the mobile phone. A Z-axis of the coordinate system is perpendicular to a screen of the mobile phone and points to a back side of the mobile phone, a Y-axis of the coordinate system is parallel to a long edge of the mobile phone, and an X-axis of the coordinate system is parallel to a short edge of the mobile phone. A shooting system of the device B, for example, a rear camera, is located at a location in which a value of the X-axis and a value of the Y-axis are negative, and the camera has a fixed field of view, for example, a horizontal field of view is 120° and a vertical field of view is 90°. An optical axis of the camera is parallel to the Z-axis of the coordinate system; a horizontal direction of the camera is parallel to the X-axis of the coordinate system and is perpendicular to the Y-axis; and a vertical direction of the camera is parallel to the Y-axis of the coordinate system, and is perpendicular to the X-axis.

A location of the device A in the coordinate system of the device B is (X1, Y1, Z1), and a location of the device A in a coordinate system of the camera of the device B is calculated as (X3, Y3, Z3) based on a difference (X2, Y2, Z2) between the origin of the coordinate system of the device B and a location of the camera of the device B. X3=X1+X2, Y3=Y1+Y2, and Z3=Z1+Z2. A horizontal angle of the device A in the camera of the device B is arctan(X3/Z3), and a vertical angle of the device A in the camera of the device B is arctan(Y3/Z3). If the horizontal angle of the device A is greater than the horizontal field of view/2, namely, |arctan(X3/Z3)|>(120°/2), or the vertical angle of the device A is greater than the vertical field of view/2, namely, |arctan(Y3/Z3)|>(90°/2), the device A is outside the field of view of the device B.

610. Shoot an image.

When it is determined that the device A is within the field of view of the device B, the device B may turn on the camera to shoot an image. The image includes an area in which the device A is located.

611. Recognize a location of the device A in the image.

After the image including the area in which the device A is located is shot, the area of the device A in the image may be recognized through image recognition.

In a possible implementation, the device A included in the image may be recognized by using an algorithm such as canny edge detection, a deep learning detection algorithm, or a support vector machine (SVM), so as to obtain the area of the device A in the image.

In another possible implementation, the area of the device A in the image may be determined based on the relative location between the device A and the device B. That is, the relative location between the device A and the device B is directly converted into a coordinate in the image. For example, in some scenarios, the device A may be shielded by an object, and the device A cannot be recognized in a shot image. In this case, the location of the device A may be calibrated into the coordinate system of the camera with reference to the location of the device A relative to the device B, and a location of the device A in the coordinate system of the camera is projected to a location in the image, to determine the area of the device A in the image.

In another possible implementation, the location of the device A in the image may be determined with reference to the relative location between the device A and the device B and image recognition.

Specifically, after the location of the device A in the image is calculated by using the relative location between the device A and the device B, a partial area including the device A is captured from the image for image recognition, so as to determine the area of the device A in the image shot by the device B.

For example, after the distance and the direction of the device A relative to the device B are learned of, if the device B has a camera, location coordinates of the device A need to be calibrated into a coordinate system of the camera. Then, a location of the device A in the coordinate system of the camera is converted into a location in the coordinate system of the image. For example, a conversion manner may include:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ \vec{0} & 0 \end{bmatrix} \begin{bmatrix} X_w \\ Y_w \\ Z_w \\ 1 \end{bmatrix},$$

where $Z_c$ represents a distance from a shot object to the camera, u represents a horizontal coordinate of the shot object in the image, v represents a longitudinal coordinate of the shot object in the image, dx and dy are sizes of a horizontal pixel and a longitudinal pixel of the camera, $u_0$ and $v_0$ are horizontal and longitudinal centers of the image, f is a focal length of the camera, R is a 3×3 matrix and represents a rotation matrix between a coordinate system of a localization system and the coordinate system of the camera, T is a 3×1 matrix and represents a translation matrix between the coordinate system of the localization system and the coordinate system of the camera, and $X_w$, $Y_w$, and $Z_w$ represent a location of the device A.

After the location of the device A in the image is learned of, a partial image is captured with this location as a center, to recognize the device A, thereby reducing calculation required for global detection of the image.

612. Highlight the location of the device A in the image.

After the area in which the device A is located in the image is determined, the area may be highlighted to prompt the user of the area of the device A in the image, so that the user can determine, based on the area highlighted in the image, a location in which the device A is located in an actual scenario. In this way, the user can quickly find the device A.

Figure 16A:
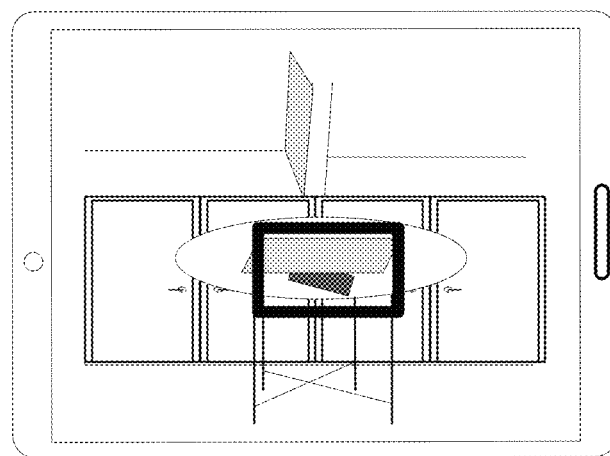
FIG. 16A is a schematic diagram of another GUI according to this disclosure.
Figure 16B:
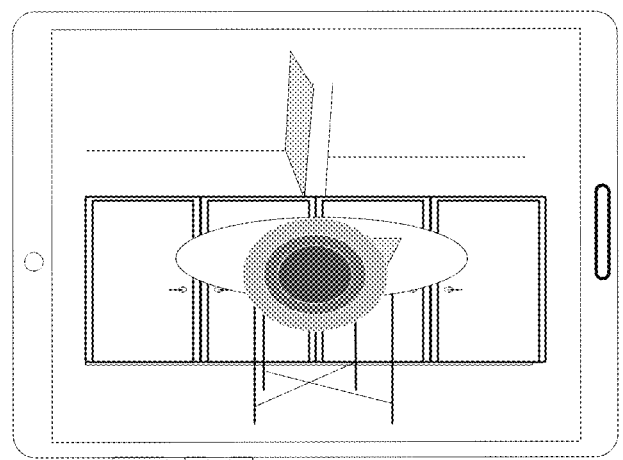
FIG. 16B is a schematic diagram of another GUI according to this disclosure.

For example, a GUI is shown in FIG. 16A and FIG. 16B. After the area of the device A in the image is determined, the area of the device A in the image may be highlighted in a form of a thermodynamic diagram. FIG. 16A shows an image in which the device A is not shielded, where the area in which the device A is located is labeled in a form of a prompting box. FIG. 16B shows a thermodynamic diagram in which the device A is shielded, where an area in which the shielded device A is located is labeled by using a thermodynamic diagram. In addition, the area of the device A in the image may be further highlighted by using a prompting box, text, an arrow, or the like, so that the user can intuitively determine the location of the device A in the actual scenario by using a highlighted area.

613. Determine whether the device B is movable; and if the device B is unmovable, perform step 614, or if the device B is movable, perform step 615.

When it is determined that the device A is not within the field of view of the device B, whether the device B is movable may be continuously determined. If the device B is movable, the device B may be indicated to move, the device B automatically moves, or the like. In other words, step 615 is performed. If the device B is unmovable, a location and direction illustration may be directly displayed. In other words, step 614 is performed.

Step 613 is an optional step, and the device B may directly learn of whether the device B is movable. For example, if the device B is a smart TV, a fixedly installed monitor, or the like, the device B is an unmovable device; or if the device B is a device that is not fixedly installed, such as a mobile phone or a tablet computer, or is a device that has a movable component, such as a vacuum cleaning robot or a cargo robot, the device B is a device that can automatically move. When the device B is a movable device, prompting may be directly performed to move the device B toward the device A or the device B may automatically move toward the device A. When the device B is unmovable, the location and direction illustration may be directly displayed.

614. Display the location and direction illustration.

Step 614 is similar to step 607. For details, refer to related descriptions in step 607, and details are not described herein again.

615. Indicate a direction in which and a distance by which the device B moves toward the device A.

After it is determined that the device B is movable, the direction in which and the distance by which the device B moves toward the device A may be displayed in the display, so that the user can move the device B toward the device A based on content displayed in the display.

Figure 17:
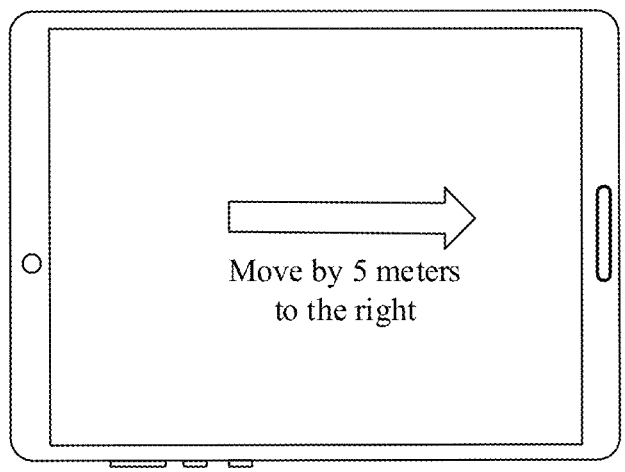
FIG. 17 is a schematic diagram of another GUI according to this disclosure.

For example, a GUI is shown in FIG. 17. Prompting may be performed in the display by using "5 meters to the right", so that the device A is within a field of view of the device B.

In some possible scenarios, the device B may automatically move. When it is determined that the device A is not within the field of view of the device B, the device B may automatically move based on the direction and the distance of the device A relative to the device B, so that the device A can be included in the field of view of the device B.

Figure 18A:
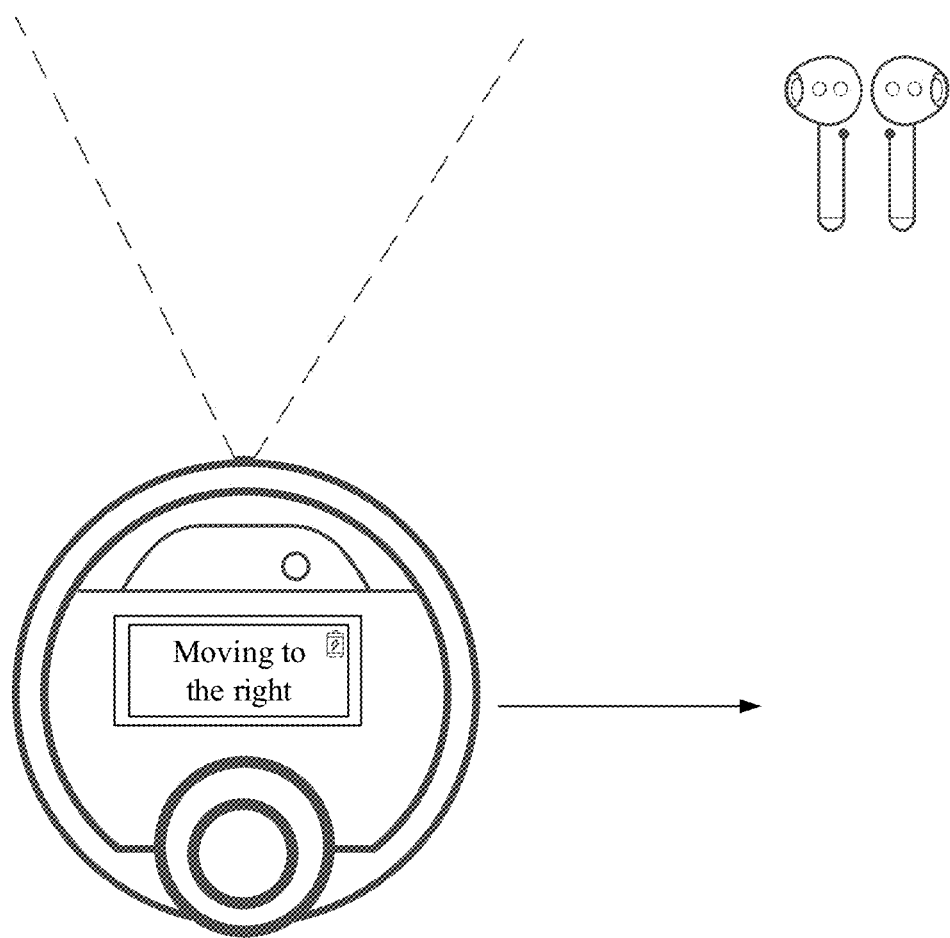
FIG. 18A is a schematic diagram of another GUI according to this disclosure.
Figure 18B:
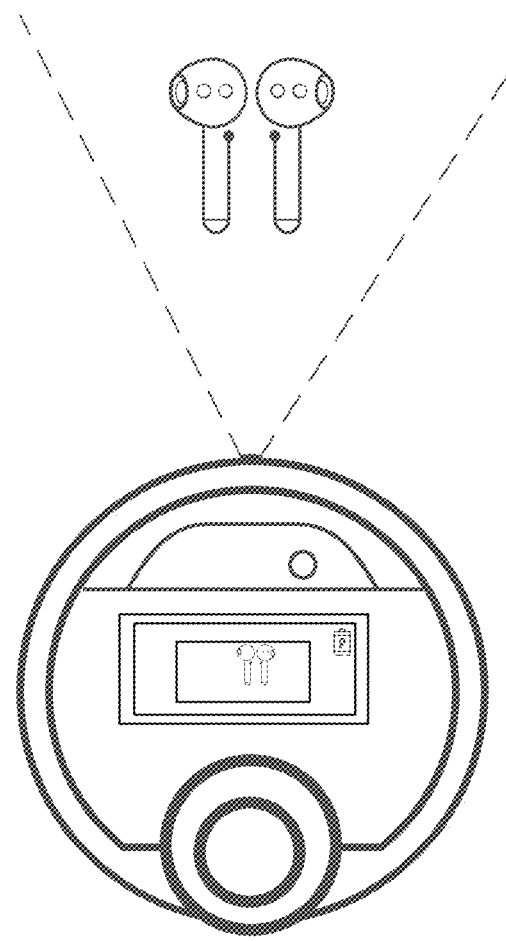
FIG. 18B is a schematic diagram of another GUI according to this disclosure.

For example, a GUI is shown in FIG. 18A. The device B may be a vacuum cleaning robot with a display. The user may indicate the vacuum cleaning robot via voice, a touchscreen, a button, or the like, to search for a wireless headset. After the vacuum cleaning robot obtains location information of the wireless headset, a direction and a distance of the wireless headset relative to the vacuum cleaning robot are calculated, to determine whether the wireless headset is within a field of view of the vacuum cleaning robot. If the wireless headset is not within the field of view of the vacuum cleaning robot and is located on a right side of the vacuum cleaning robot, the vacuum cleaning robot may move to the right in this case, so that the wireless headset is within the field of view of the vacuum cleaning robot, as shown in FIG. 18B.

616. Update the relative location in real time.

When the device B moves toward the device A, if the device B detects that the device B moves, the device B may update a location of the device B in real time and calculate the location of the device A relative to the device B in real time, and possibly, may further display a change of the relative location in the display.

Figure 19:
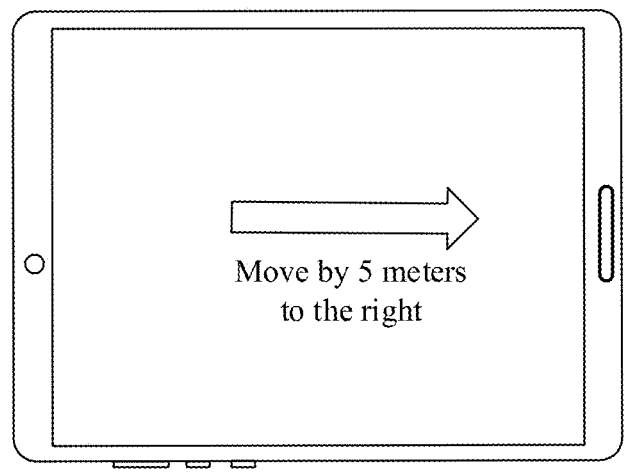
FIG. 19 is a schematic diagram of another GUI according to this disclosure.
Figure 20:
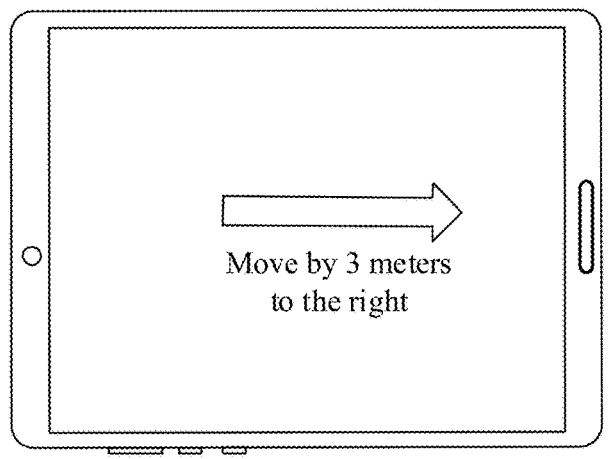
FIG. 20 is a schematic diagram of another GUI according to this disclosure.

For example, a GUI is shown in FIG. 19 and FIG. 20. The device B may be a tablet computer. In FIG. 19, the user may be prompted to hold the tablet computer and move by 5 meters to the right. In a moving process, for example, after the user moves by 2 meters to the right, as shown in FIG. 20, "move by 3 meters to the right" is displayed in a display of the tablet computer, so that a to-be-searched device is within a field of view of the tablet computer.

Therefore, in this implementation of this disclosure, prompting may be performed, in the device B, on the relative location between the device A and the device B, so that the user can quickly find the device A based on the relative location, thereby improving user experience. If the device B has the shooting function and the display function, the area of the device A in the image may be highlighted in the display interface of the device B, so that the user can intuitively observe an actual location of the device A by using content highlighted in the image, to quickly find the device A.

The foregoing describes in detail the device searching method provided in this disclosure. With reference to the foregoing device searching method, the following describes in detail a structure of an electronic device that performs the device searching method.

Figure 21:
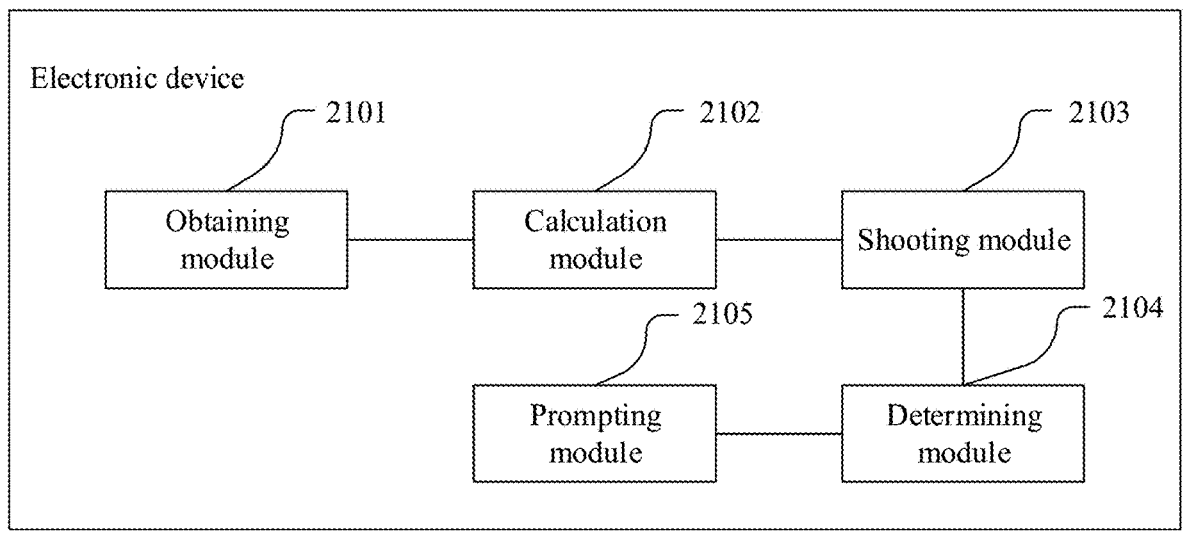
FIG. 21 is a schematic diagram of a structure of another electronic device according to this disclosure.

FIG. 21 is a schematic diagram of a structure of an electronic device according to this disclosure.

The electronic device includes: an obtaining module 2101, configured to obtain location information of a second device; a calculation module 2102, configured to obtain a relative location between the second device and a first device based on location information of the electronic device and the location information of the second device; a shooting module 2103, configured to: if it is determined, based on the relative location, that the second device is within a shooting range of the first device, shoot a first image; a determining module 2104, configured to determine, by using the first device, an area in which the second device is located in the first image; and a prompting module 2105, configured to highlight the area in which the second device is located in the first image.

In a possible implementation, the prompting module 2105 is further configured to display the entire first image or a part of the first image.

In a possible implementation, the prompting module 2105 is further configured to perform prompting based on the relative location between the second device and the first device.

In a possible implementation, the relative location includes a first distance between the first device and the second device and a first direction of the second device relative to the first device. The prompting module 2105 is specifically configured to perform, by using the first device, prompting on at least one of the first distance and the first direction.

In a possible implementation, the prompting module 2105 is specifically configured to: display at least one of the first distance and the first direction in a display interface; or play voice guidance, where the voice guidance includes a voice of at least one of the first distance and the first direction.

In a possible implementation, the prompting module 2105 is further configured to: if the second device is not within the shooting range of the first device, perform prompting to move the first device toward the second device, until the second device is within the shooting range of the first device.

In a possible implementation, the calculation module 2102 is further configured to: if it is detected that the electronic device moves, update the relative location between the first device and the second device based on real-time location information of the electronic device, to obtain an updated relative location.

The prompting module 2105 is configured to indicate the updated relative location.

In a possible implementation, if the second device is within the shooting range of the first device, and the second device is shielded by an obstacle within the shooting range, the determining module 2104 is further configured to calculate, based on the relative location, an area in which the shielded second device is located in the first image.

The obtaining module 2101 is specifically configured to: establish a communication connection, and receive the location information sent by the second device.

In a possible implementation, the obtaining module 2101 is specifically configured to: establish a communication connection to a third device; and receive the location information of the second device sent by the third device, where the location information is sent to the third device by the second device.

In a possible implementation, the obtaining module 2101 is specifically configured to: before the area in which the second device is located in the first image is determined, obtain a device attribute of the second device, where the device attribute includes a type or an appearance of the second device.

Figure 22:
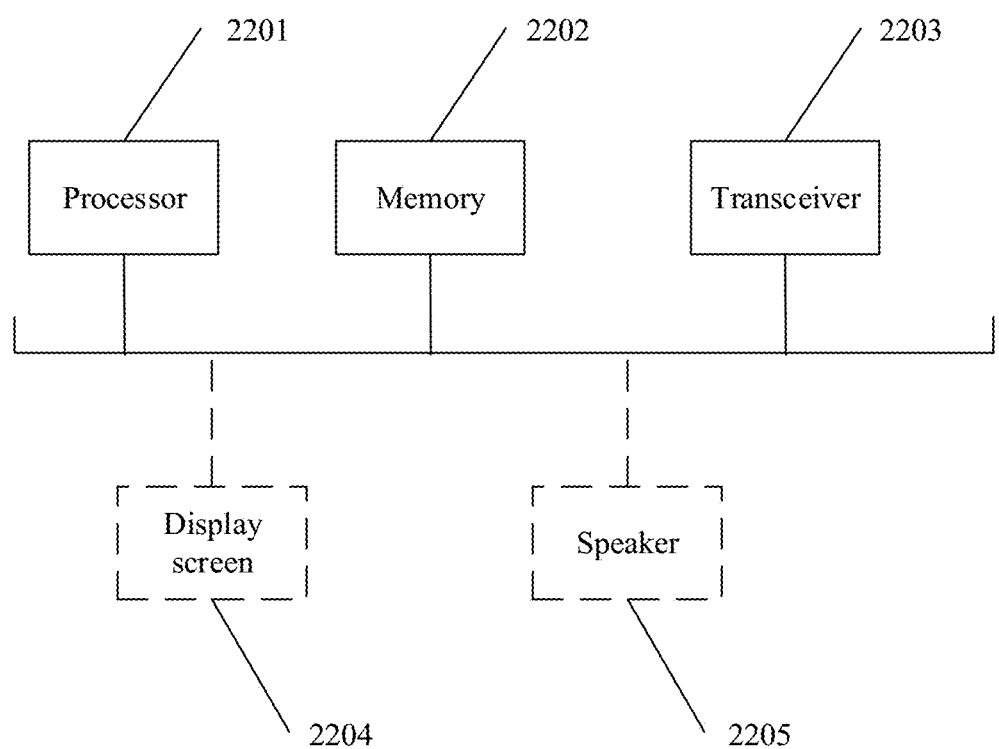
FIG. 22 is a schematic diagram of a structure of another electronic device according to this disclosure.

FIG. 22 is a schematic diagram of a structure of another electronic device according to this disclosure. Details are described as follows.

The electronic device may include a processor 2201, a memory 2202, and a transceiver 2203. The processor 2201 and the memory 2202 are interconnected by using a line. The memory 2202 stores program instructions and data.

The memory 2202 stores program instructions and data that correspond to the steps in FIG. 4 to FIG. 20.

The processor 2201 is configured to perform the method steps performed by the first device or the electronic device shown in any embodiment in FIG. 4 to FIG. 20.

The transceiver 2203 is configured to perform the step of receiving or sending data that is performed by the first device or the electronic device shown in any embodiment in FIG. 4 to FIG. 20.

Optionally, the electronic device may further include a display 2204, configured to display the interface displayed by the first device or the electronic device in FIG. 4 to FIG. 20.

Optionally, the electronic device may further include a speaker 2205, configured to play the voice played by the first device or the electronic device in FIG. 4 to FIG. 20.

An embodiment of this disclosure further provides a computer-readable storage medium. The computer-readable storage medium stores a program used to generate a vehicle travel speed. When the program runs on a computer, the computer is enabled to perform the steps in the methods described in the embodiments shown in FIG. 4 to FIG. 20.

Optionally, the electronic device shown in FIG. 22 is a chip.

An embodiment of this disclosure further provides an electronic device. The electronic device may also be referred to as a digital processing chip or a chip. The chip includes a processing unit and a communication interface. The processing unit obtains program instructions through the communication interface. When the program instructions are executed by the processing unit, the processing unit is configured to perform the steps in the methods performed by the electronic device that are shown in any one of the foregoing embodiments in FIG. 4 to FIG. 10B.

An embodiment of this disclosure further provides a digital processing chip. A circuit and one or more interfaces that are configured to implement the processor 2201 or a function of the processor 2201 are integrated into the digital processing chip. When a memory is integrated into the digital processing chip, the digital processing chip may complete the steps in the methods in any one or more of the foregoing embodiments. When a memory is not integrated into the digital processing chip, the digital processing chip may be connected to an external memory through a communication interface. The digital processing chip implements, based on program code stored in the external memory, the actions performed by the electronic device in the foregoing embodiments.

An embodiment of this disclosure further provides a computer program product including instructions. When the computer program product runs on a computer, the computer is enabled to perform the steps performed by the electronic device in the methods described in the embodiments shown in FIG. 4 to FIG. 20.

The electronic device provided in embodiments of this disclosure may be specifically a chip. The chip includes a processing unit and a communication unit. The processing unit may be, for example, a processor. The communication unit may be, for example, an input/output interface, a pin, or a circuit. The processing unit may execute computer-executable instructions stored in a storage unit, so that the chip in a server performs the device searching methods described in the embodiments shown in FIG. 4 to FIG. 20. Optionally, the storage unit is a storage unit in the chip, for example, a register or a cache; or the storage unit may be a storage unit that is in the radio access device end and that is located outside the chip, for example, a read-only memory (ROM), another type of static storage device that can store static information and instructions, or a random-access memory (RAM).

Specifically, the processing unit or the processor may be a central processing unit (CPU), a neural-network processing unit (NPU), a graphics processing unit (GPU), a digital signal processor (DSP), an application-specific integrated circuit (ASIC), a field-programmable gate array (FPGA), another programmable logic device, a discrete gate, a transistor logic device, a discrete hardware component, or the like. The general-purpose processor may be a microprocessor, or may be any conventional processor, or the like.

Figure 23:
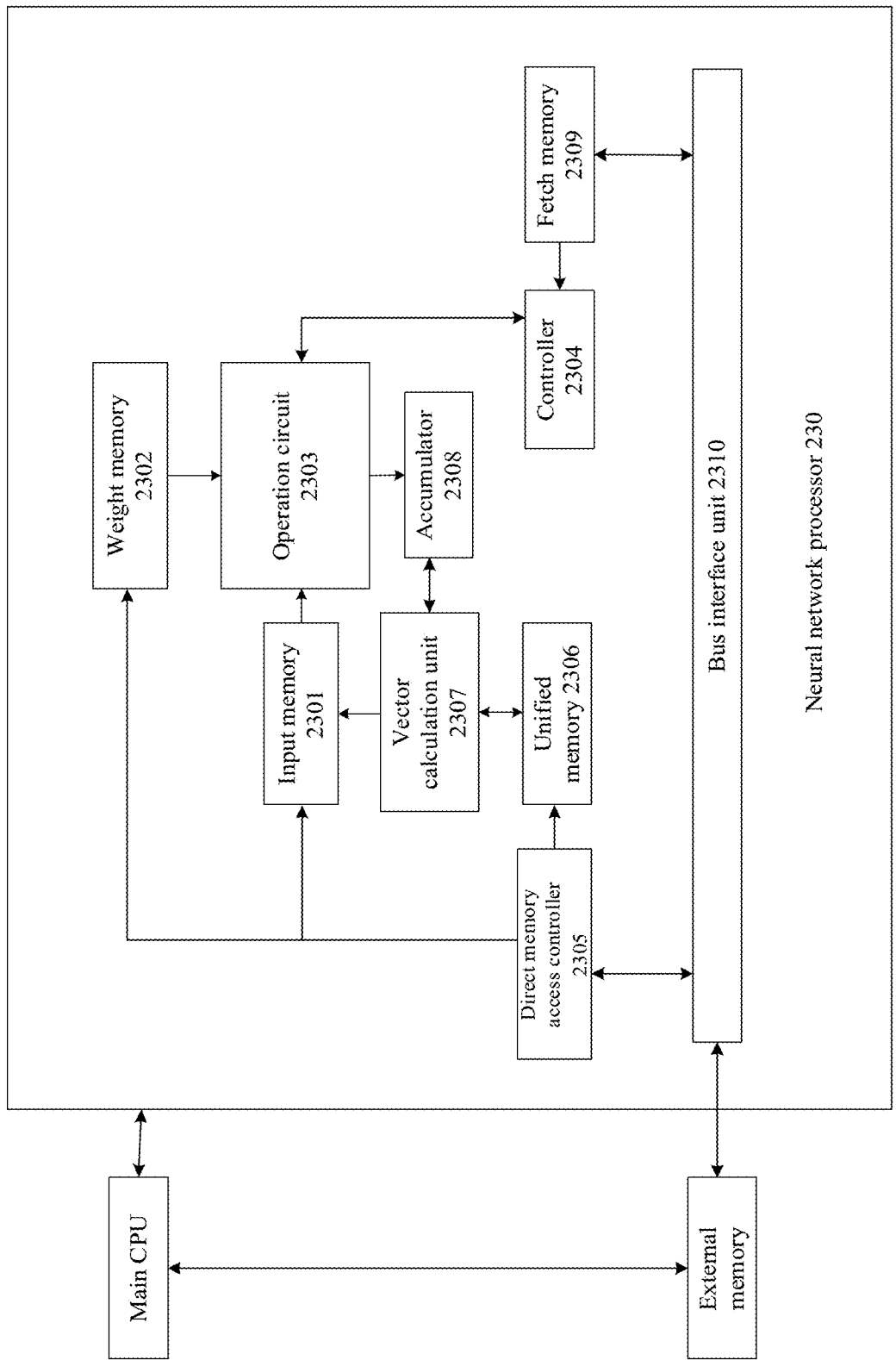
FIG. 23 is a schematic diagram of a structure of a chip according to this disclosure.

For example, FIG. 23 is a schematic diagram of a structure of a chip according to an embodiment of this disclosure. The chip may be represented as a neural-network processing unit NPU 230. The NPU 230 is mounted onto a host CPU as a coprocessor, and the host CPU allocates a task. A core part of the NPU is an operation circuit 2303. The operation circuit 2303 is controlled by a controller 2304 to extract matrix data in a memory and perform a multiplication operation.

In some implementations, the operation circuit 2303 internally includes a plurality of processing engines (PEs). In some implementations, the operation circuit 2303 is a two-dimensional systolic array. The operation circuit 2303 may alternatively be a one-dimensional systolic array or another electronic circuit that can perform mathematical operations such as multiplication and addition. In some implementations, the operation circuit 2303 is a general-purpose matrix processor.

For example, it is assumed that there are an input matrix A, a weight matrix B, and an output matrix C. The operation circuit 2303 fetches data corresponding to the matrix B from a weight memory 2302 and buffers the data on each PE in the operation circuit. The operation circuit 2303 fetches data of the matrix A from an input memory 2301, to perform a matrix operation with the matrix B to obtain a partial result or a final result of a matrix, and stores the result into an accumulator 2308.

The unified memory 2306 is configured to store input data and output data. The weight data is directly transferred to the weight memory 2302 by using a direct memory access controller (DMAC) 2305. The input data is also transferred to the unified memory 2306 by using the DMAC 2305.

A bus interface unit (BIU) 2310 is configured to interact with the DMAC and an instruction fetch buffer (IFB) 2309 through an AXI bus.

The bus interface unit (BIU) 2310 is used by the instruction fetch buffer 2309 to obtain instructions from an external memory, and is further used by the direct memory access controller 2305 to obtain raw data corresponding to the input matrix A or the weight matrix B from the external memory.

The DMAC 2305 is mainly configured to transfer input data in the external memory DDR to the unified memory 2306, transfer weight data to the weight memory 2302, or transfer input data to the input memory 2301.

A vector calculation unit 2307 includes a plurality of operation processing units; and if necessary, performs further processing such as vector multiplication, vector addition, an exponential operation, a logarithmic operation, or value comparison on an output of the operation circuit. The vector calculation unit 2307 is mainly configured to perform network calculation at a non-convolutional/fully connected layer in a neural network, for example, batch normalization (batch normalization), pixel-level summation, and upsampling on a feature plane.

In some implementations, the vector calculation unit 2307 can store a processed output vector into the unified memory 2306. For example, the vector calculation unit 2307 may apply a linear function and/or a non-linear function to the output of the operation circuit 2303, for example, perform linear interpolation on a feature plane extracted at a convolutional layer, and for another example, accumulate vectors of values to generate an activation value. In some implementations, the vector calculation unit 2307 generates a normalized value, a value obtained through pixel-level summation, or a combination thereof. In some implementations, the processed output vector can be used as an activation input for the operation circuit 2303, for example, the processed output vector is used in a subsequent layer in the neural network.

The instruction fetch buffer 2309 connected to the controller 2304 is configured to store an instruction used by the controller 2304.

The unified memory 2306, the input memory 2301, the weight memory 2302, and the instruction fetch buffer 2309 all are on-chip memories. The external memory is private to a hardware architecture of the NPU.

An operation at each layer in a recurrent neural network may be performed by the operation circuit 2303 or the vector calculation unit 2307.

The processor mentioned above may be a general-purpose central processing unit, a microprocessor, an ASIC, or one or more integrated circuits for controlling program execution of the methods in FIG. 4 to FIG. 20.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all of the modules may be selected based on an actual requirement to achieve the objectives of the solutions of embodiments. In addition, in the accompanying drawings of the apparatus embodiments provided in this disclosure, connection relationships between modules indicate that the modules have communication connections to each other, which may be specifically implemented as one or more communication buses or signal cables.

Based on the descriptions of the foregoing implementations, a person skilled in the art may clearly understand that this disclosure may be implemented by software in addition to necessary universal hardware, or certainly may be implemented by dedicated hardware, including a dedicated integrated circuit, a dedicated CPU, a dedicated memory, a dedicated component and part, and the like. Usually, all functions completed by a computer program may be easily implemented by using corresponding hardware, and a specific hardware structure used to implement a same function may also be in various forms, for example, a form of an analog circuit, a digital circuit, or a dedicated circuit. However, in this disclosure, a software program implementation is a better implementation in most cases. Based on such an understanding, the technical solutions of this disclosure may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in embodiments of this disclosure.

All or some of the foregoing embodiments may be implemented by using software, hardware, firmware, or any combination thereof. When software is used to implement embodiments, all or some of embodiments may be implemented in a form of a computer program product.

The computer program product includes one or more computer instructions. When the computer program instructions are loaded and executed on the computer, the procedure or functions according to the embodiments of this disclosure are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state disk (SSD)), or the like.

In the specification, claims, and accompanying drawings of this disclosure, the terms "first", "second", "third", "fourth", and the like (if existent) are intended to distinguish between similar objects but do not necessarily indicate a specific order or sequence. It should be understood that the data termed in such a way are interchangeable in an appropriate circumstance, so that the embodiments described herein can be implemented in an order other than the order illustrated or described herein. Moreover, terms "include", "comprise", and any other variants mean to cover non-exclusive inclusion, for example, a process, method, system, product, or device that includes a list of steps or units is not necessarily limited to those steps or units, but may include other steps or units not expressly listed or inherent to such a process, method, product, or device.

Finally, it should be noted that the foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A device searching method implemented by a first device, the device searching method comprising:
    obtaining first location information of a second device;
    obtaining a relative location between the second device and the first device based on second location information of the first device and the first location information;
    determining, based on the relative location, whether the second device is within a shooting range of the first device;
    indicating, when the second device is not within the shooting range, to move the first device toward the second device until the second device is within the shooting range;
    shooting, when the second device is within the shooting range, a first image;
    determining an area in the first image in which the second device is located; and
    highlighting the area.

2. The device searching method of claim 1, further comprising performing prompting based on the relative location.

3. The device searching method of claim 2, wherein the relative location comprises a first distance between the first device and the second device and a first direction of the second device relative to the first device, and wherein performing the prompting comprises performing the prompting according to at least one of the first distance or the first direction.

4. The device searching method of claim 3, wherein performing the prompting further comprises:
  displaying at least one of the first distance or the first direction on a display interface; or
  playing voice guidance that comprises a voice indicating at least one of the first distance or the first direction.

5. The device searching method of claim 1, wherein after indicating to move the first device toward the second device, the device searching method further comprises:
  detecting whether the first device has moved;
  updating, when the first device has moved, the relative location based on real-time location information of the first device; and
  indicating an updated relative location.

6. The device searching method of claim 1, wherein determining the area comprises:
  determining whether the second device is shielded by an obstacle within the shooting range; and
  calculating, when the second device is shielded by the obstacle within the shooting range and based on the relative location, the area.

7. The device searching method of claim 1, wherein obtaining the first location information comprises:
  establishing a communication connection to the second device; and
  receiving the first location information from the second device.

8. A first device, comprising:
  a camera;
  a transceiver configured to obtain first location information of a second device;
  a processor coupled to the camera and the transceiver and configured to:
    obtain a relative location between the second device and the first device based on second location information of the first device and the first location information;
    determine, based on the relative location, whether the second device is within a shooting range of the camera;
    indicate, when the second device is not within the shooting range, to move the first device toward the second device until the second device is within the shooting range;
    instruct, when the second device is within the shooting range, the camera to shoot a first image; and
    determine an area in the first image in which the second device is located; and
  a display coupled to the processor and configured to highlight the area.

9. The first device of claim 8, wherein the processor is further configured to instruct to perform prompting based on the relative location.

10. The first device of claim 9, wherein the relative location comprises a first distance between the first device and the second device and a first direction of the second device relative to the first device, and wherein the processor is further configured to instruct to perform prompting according to at least one of the first distance or the first direction.

11. The first device of claim 10, wherein the display is further configured to display at least one of the first distance or the first direction based on instruction from the processor, or wherein the first device further comprises a speaker configured to play voice guidance based on instruction from the processor and the voice guidance comprises a voice indicating at least one of the first distance or the first direction.

12. The first device of claim 8, wherein the display is further configured to display, based on instruction from the processor, prompting information indicating to move the first device toward the second device until the second device is within the shooting range, or wherein the first device further comprises a speaker configured to play, based on instruction from the processor, the prompting information until the second device is within the shooting range.

13. The first device of claim 8, wherein the processor is further configured to:
  detect whether the first device has moved; and
  update, when the first device has moved, the relative location based on real-time location information of the first device to obtain an updated relative location, and
  wherein either:
    the display is further configured to display the updated relative location; or
    the first device further comprises a speaker configured to play a voice indicating the updated relative location.

14. The first device of claim 8, wherein the processor is further configured to:
  determine whether the second device is shielded by an obstacle within the shooting range; and
  calculate, when the second device is shielded by the obstacle within the shooting range and based on the relative location, the area.

15. The first device of claim 8, wherein the transceiver is further configured to:
  establish a communication connection to the second device; and
  receive the first location information from the second device.

16. A first device, comprising:
  a display;
  a memory configured to store instructions comprising code for a graphical user interface (GUI) of an application; and
  one or more processors coupled to the display and the memory and configured to execute the instructions to cause the first device to:
    display, using the display and in the GUI, information about a to-be-searched second device;
    obtain first location information of the to-be-searched second device;
    obtain a relative location between the to-be-searched second device and the first device based on second location information of the first device and the first location information;
    determine, in response to an operation on the to-be-searched second device and based on the relative location, whether the to-be-searched second device is within a shooting range of the first device;
    display, using the display and in the GUI and when the to-be-searched second device is not within the shooting range, prompting information indicating to move the first device toward the to-be-searched second device until the to-be-searched second device is within the shooting range;
    shoot, when the to-be-searched second device is within the shooting range, a first image; determine an area in the first image in which the to-be-searched second device is located; and highlight, using the display and in the GUI, the area of the first image in which the to-be-searched second device is located.

17. The first device of claim 16, wherein the one or more processors are further configured to cause the first device to display, using the display and in the GUI, the relative location.

18. The first device of claim 17, wherein the relative location comprises a first distance between the first device and the to-be-searched second device and a first direction of the to-be-searched second device relative to the first device, and wherein the one or more processors are further configured to cause the first device to display, using the display and in the GUI, at least one of the first distance or the first direction.

19. The first device of claim 16, wherein the one or more processors are further configured to cause the first device to:
   detect whether the first device has moved;
   update, when the first device has moved, the relative location based on real-time location information of the first device to obtain an updated relative location; and
   display, using the display and in the GUI, the updated relative location.

20. The first device of claim 16, wherein the one or more processors are further configured to cause the first device to:
   determine whether the to-be-searched second device is shielded by an obstacle within the shooting range;
   calculate, based on the relative location and when the to-be-searched second device is shielded by the obstacle within the shooting range, the area; and
   highlight, using the display and in the GUI, the area.

21. A non-transitory computer-readable storage medium comprising a program, that when executed by one or more processors, causes a first device to:
   obtain first location information of a second device;
   obtain a relative location between the second device and the first device based on second location information of the first device and the first location information;
   determine, based on the relative location, whether the second device is within a shooting range of the first device;
   indicate, when the first device determines that the second device is not within the shooting range, to move the first device toward the second device until the second device is within the shooting range;
   shoot, when the second device is within the shooting range, a first image;
   determine an area in the first image in which the second device is located; and
   highlight the area.

* * * * *